(12) United States Patent
Takashima et al.

(10) Patent No.: US 8,436,839 B2
(45) Date of Patent: May 7, 2013

(54) INPUT DEVICE HAVING TACTILE FUNCTION, INFORMATION INPUT METHOD, AND ELECTRONIC DEVICE

(75) Inventors: Kouichiro Takashima, Shinagawa-ku (JP); Mikio Takenaka, Shinagawa-ku (JP); Shigeaki Maruyama, Shinagawa-ku (JP); Hiroto Kawaguchi, Shinagawa-ku (JP); Junichi Sekine, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 10/594,247

(22) PCT Filed: Mar. 24, 2005

(86) PCT No.: PCT/JP2005/006196
§ 371 (c)(1),
(2), (4) Date: Jul. 25, 2008

(87) PCT Pub. No.: WO2005/093556
PCT Pub. Date: Oct. 6, 2005

(65) Prior Publication Data
US 2008/0296072 A1    Dec. 4, 2008

(30) Foreign Application Priority Data
Mar. 26, 2004  (JP) .................................. 2004-093711

(51) Int. Cl.
*G06K 11/06* (2006.01)

(52) U.S. Cl.
USPC ........................................................ 345/184

(58) Field of Classification Search .................. 345/156, 345/161, 184
See application file for complete search history.

(56) References Cited

U.S. PATENT DOCUMENTS

| | | | | |
|---|---|---|---|---|
| 2001/0004861 A1* | 6/2001 | Suzuki et al. | ................... | 84/609 |
| 2001/0035854 A1* | 11/2001 | Rosenberg et al. | ........... | 345/156 |
| 2002/0140667 A1* | 10/2002 | Horiki | ........................... | 345/156 |
| 2003/0134256 A1* | 7/2003 | Tretiakoff et al. | ............ | 434/112 |
| 2005/0007342 A1* | 1/2005 | Cruz-Hernandez et al. | .. | 345/161 |
| 2005/0134561 A1* | 6/2005 | Tierling et al. | ............... | 345/156 |
| 2007/0057913 A1* | 3/2007 | Eid et al. | ....................... | 345/156 |

FOREIGN PATENT DOCUMENTS

| | | |
|---|---|---|
| JP | 2001 255993 | 9/2001 |
| JP | 2003 296015 | 10/2003 |
| JP | 2004 46792 | 2/2004 |

OTHER PUBLICATIONS

Supplementary European Search Report issued Nov. 5, 2010, in European Patent Application No. 05721684.8.

* cited by examiner

*Primary Examiner* — Quan-Zhen Wang
*Assistant Examiner* — Tony Davis
(74) *Attorney, Agent, or Firm* — Oblon, Spivak, McClelland, Maier & Neustadt, L.L.P.

(57) ABSTRACT

A haptic function-provided input device performs a touch operation to slide on an input detection plane. The device includes an input detection unit, which has the input detection plane, that detects a touching position of an operation body and a sliding speed of the operation body. The device also includes a computation unit that computes a vibration pattern based on the sliding speed detected by the input detection unit. Further, the device includes a vibration unit that vibrates the input detection plane based on the vibration pattern computed by the computation unit. The computation unit computes the vibration pattern further based on a shift in an excitation timing between two actuators of the vibration unit.

14 Claims, 15 Drawing Sheets

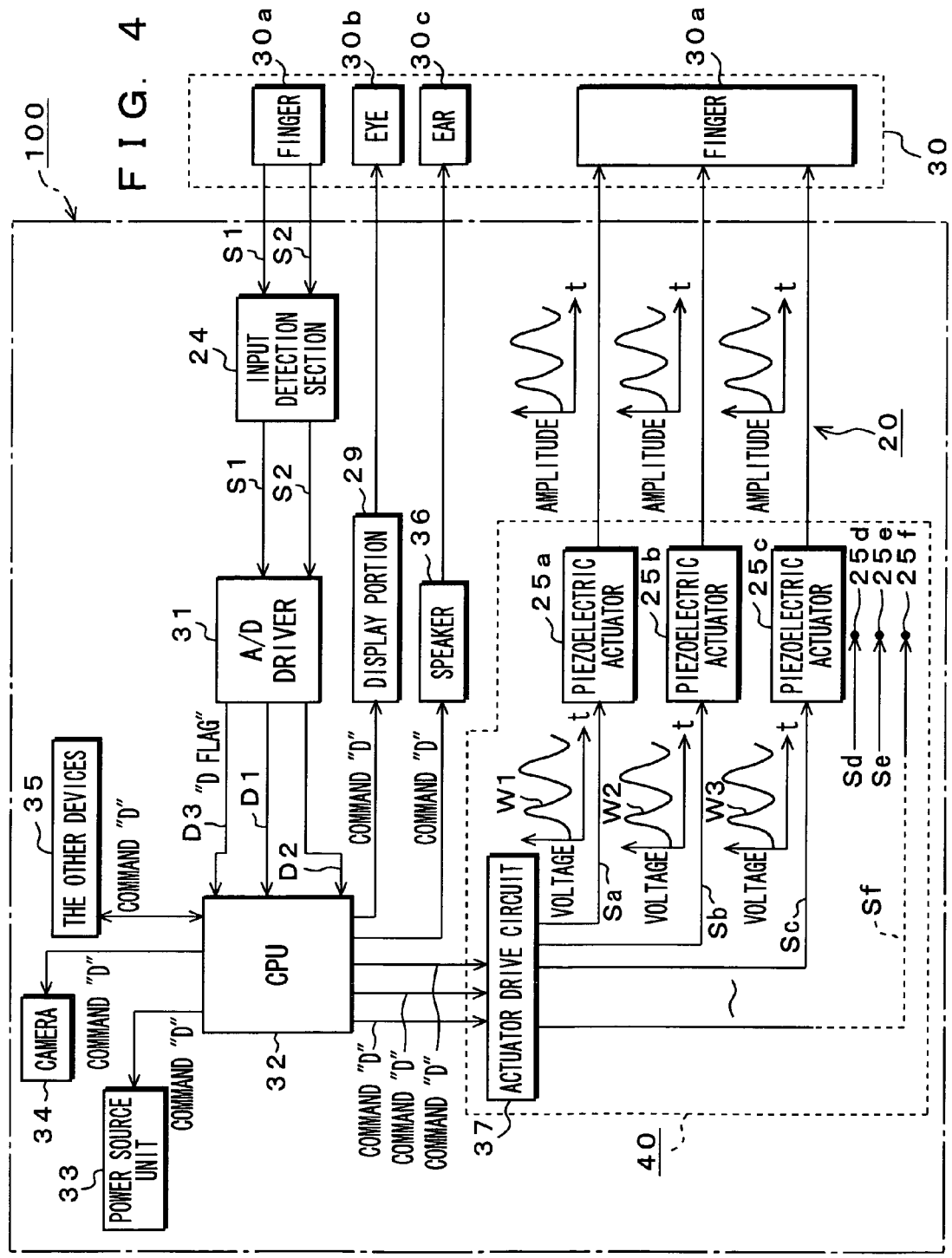

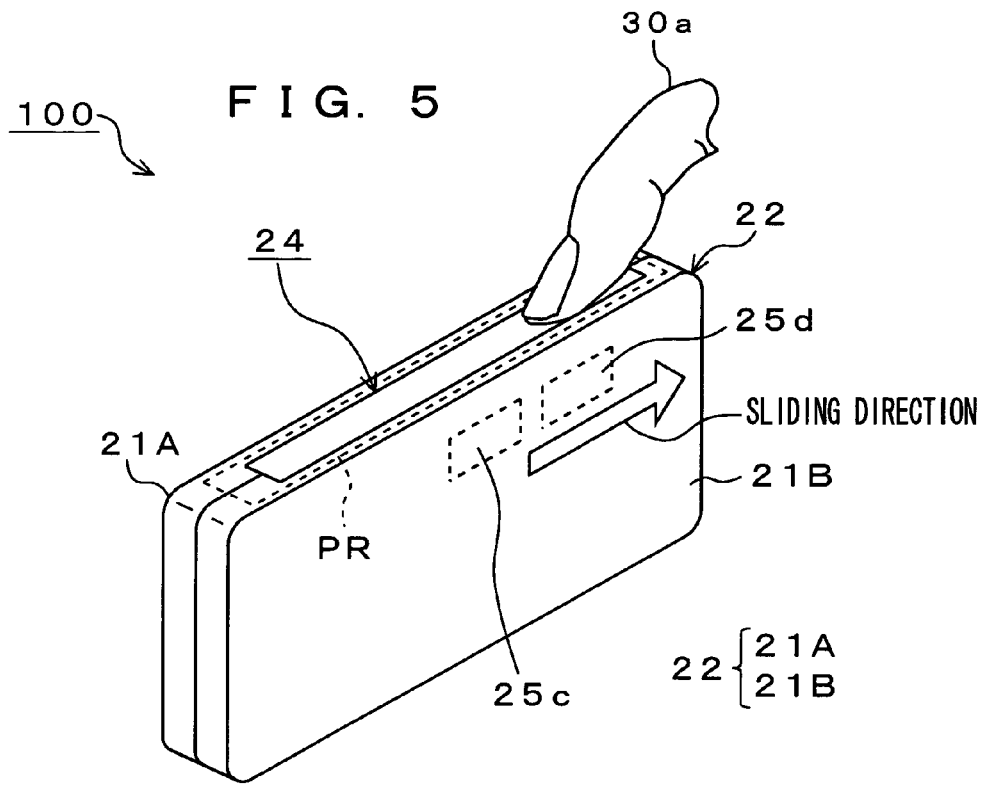
FIG. 5
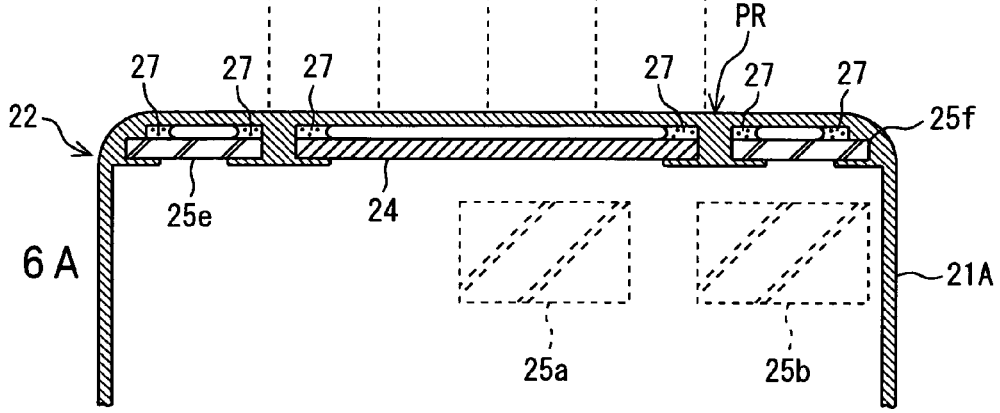
FIG. 6B
FIG. 6A

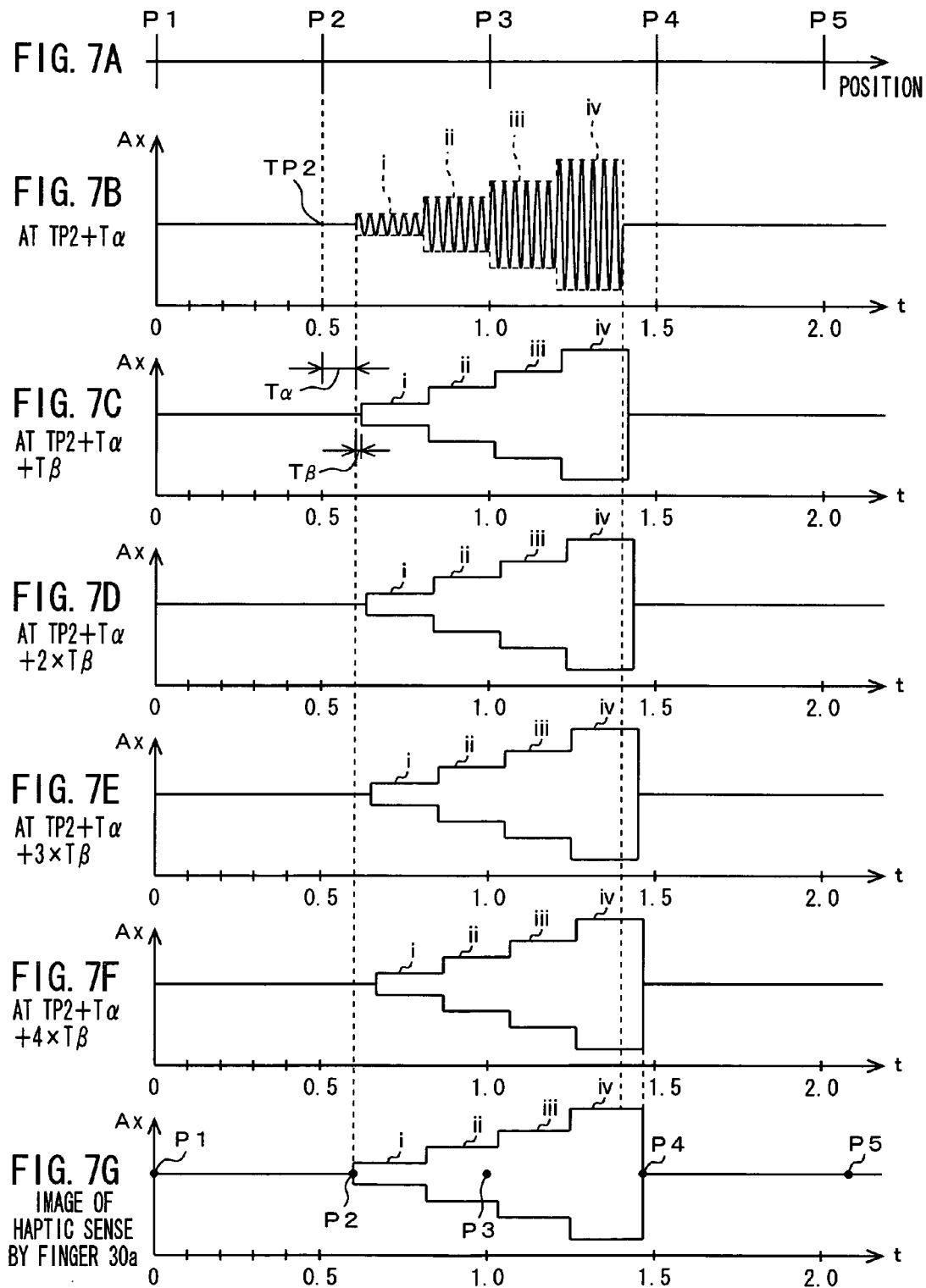

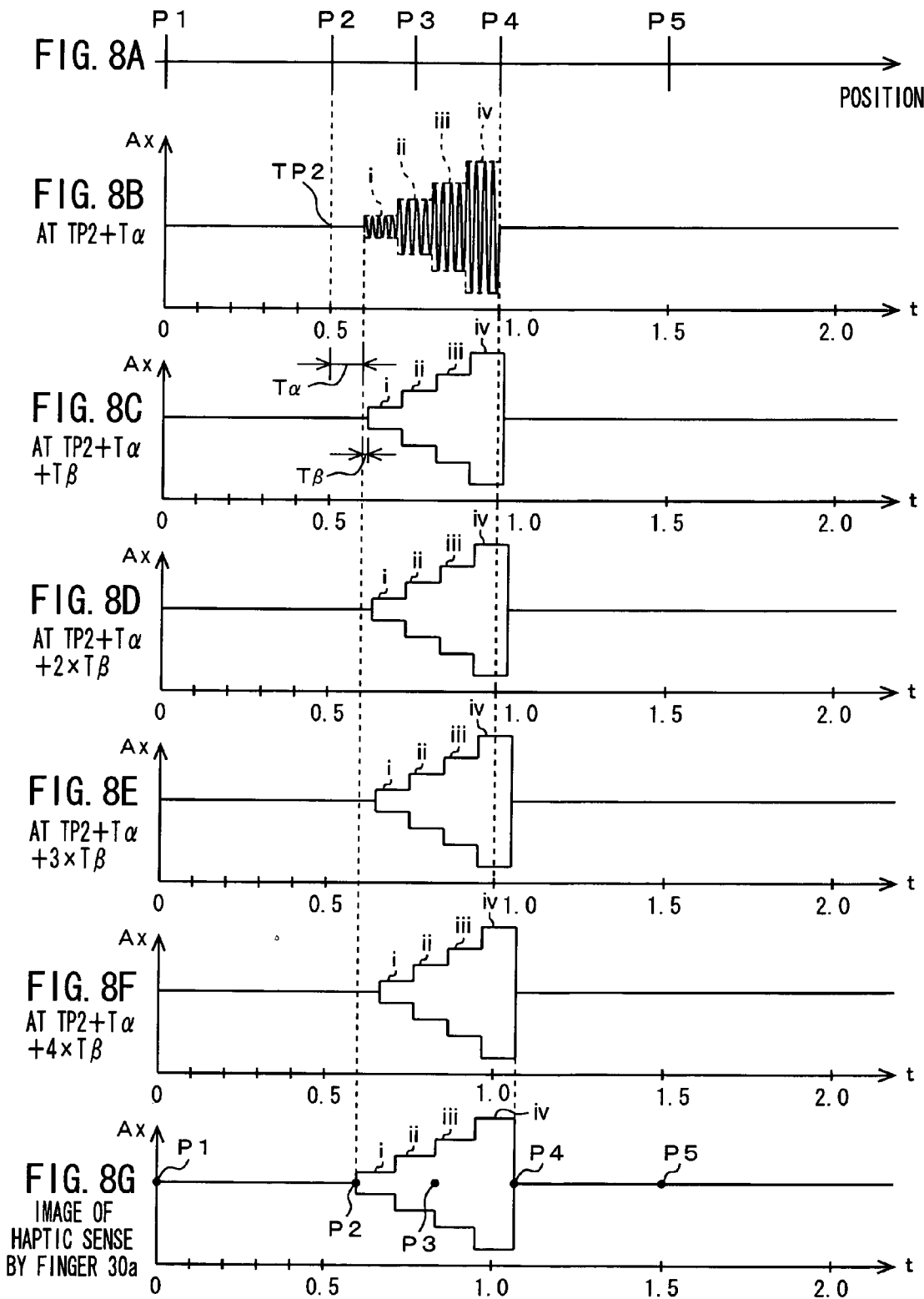

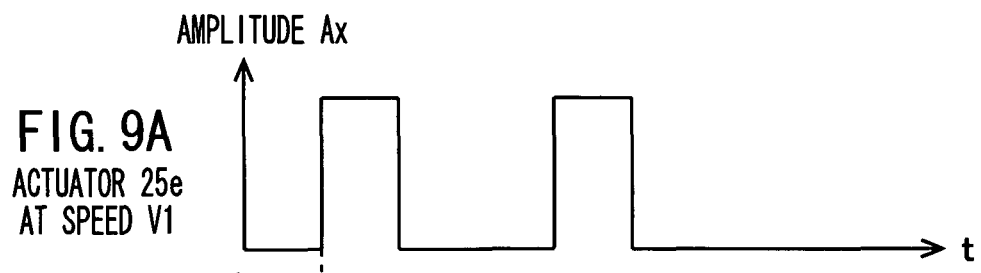
FIG. 9A ACTUATOR 25e AT SPEED V1
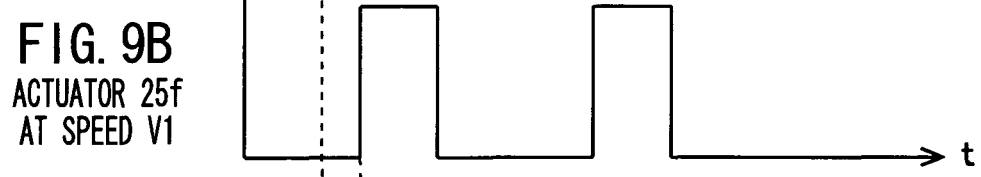
FIG. 9B ACTUATOR 25f AT SPEED V1
FIG. 9C LAPSE OF CONTACTING TIME
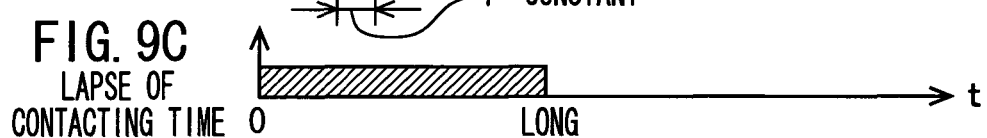
FIG. 9D ACTUATOR 25e AT SPEED V2
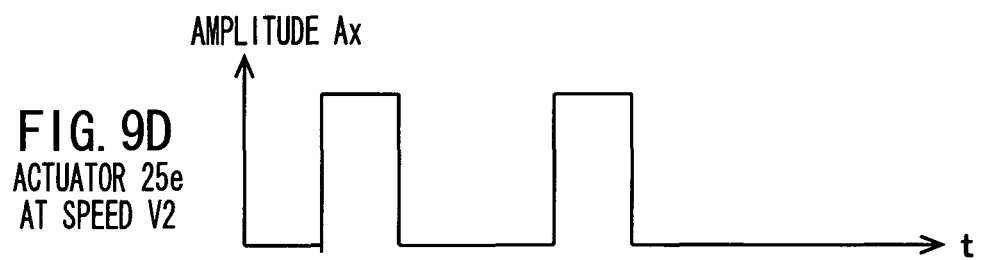
FIG. 9E ACTUATOR 25f AT SPEED V2
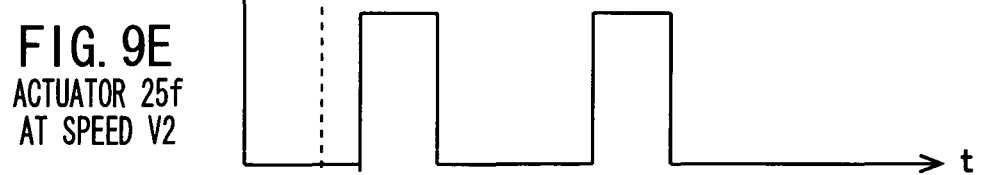
FIG. 9F LAPSE OF CONTACTING TIME
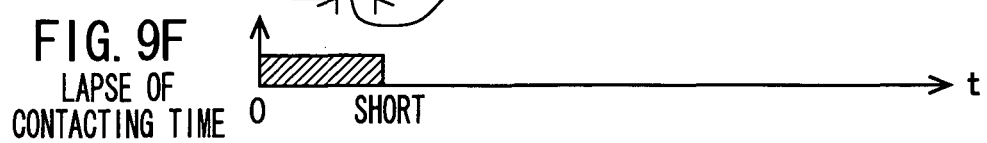

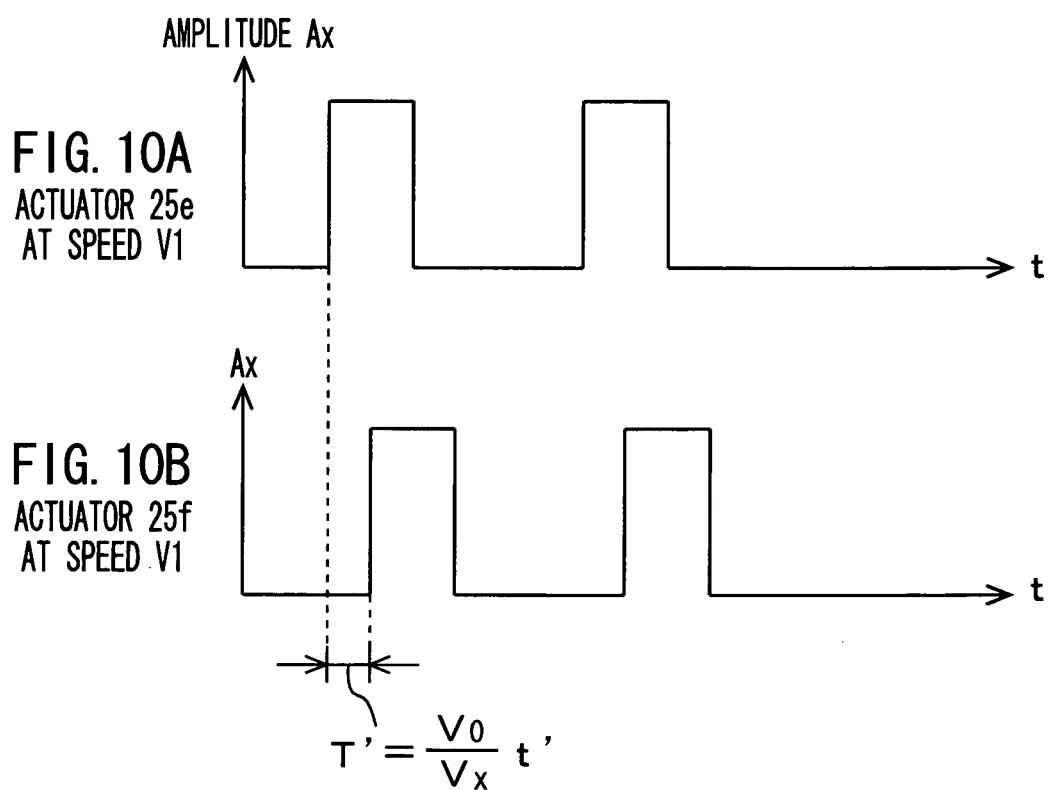

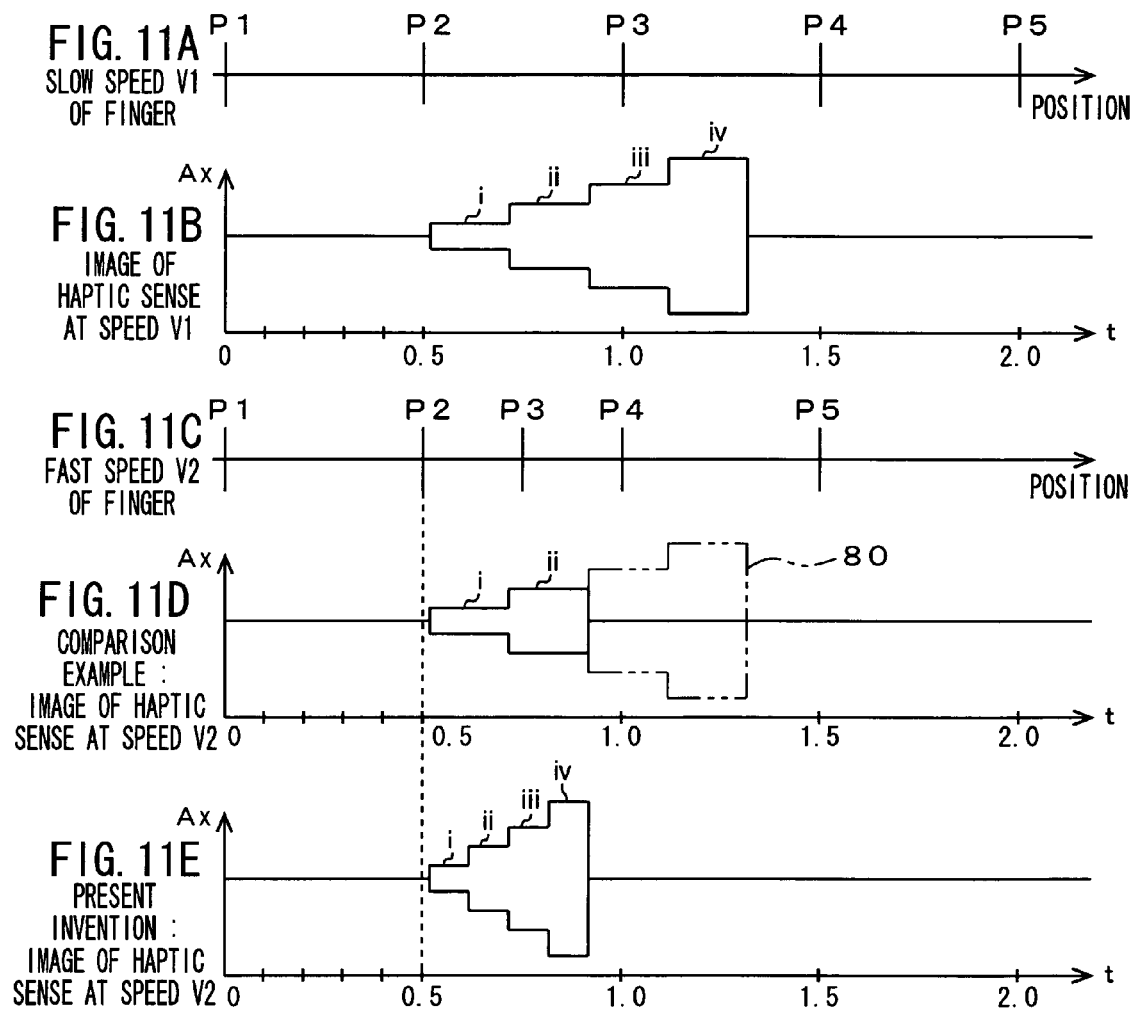

29

29

29

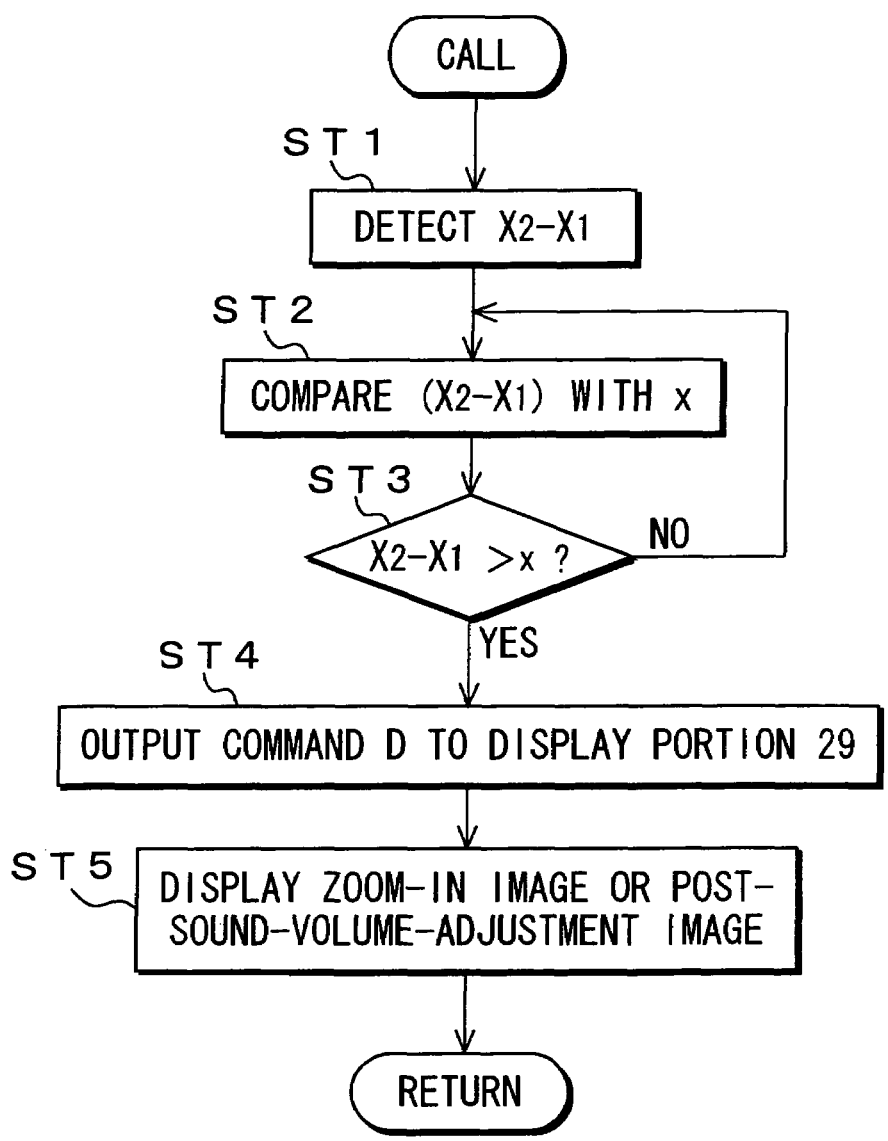

F I G. 16
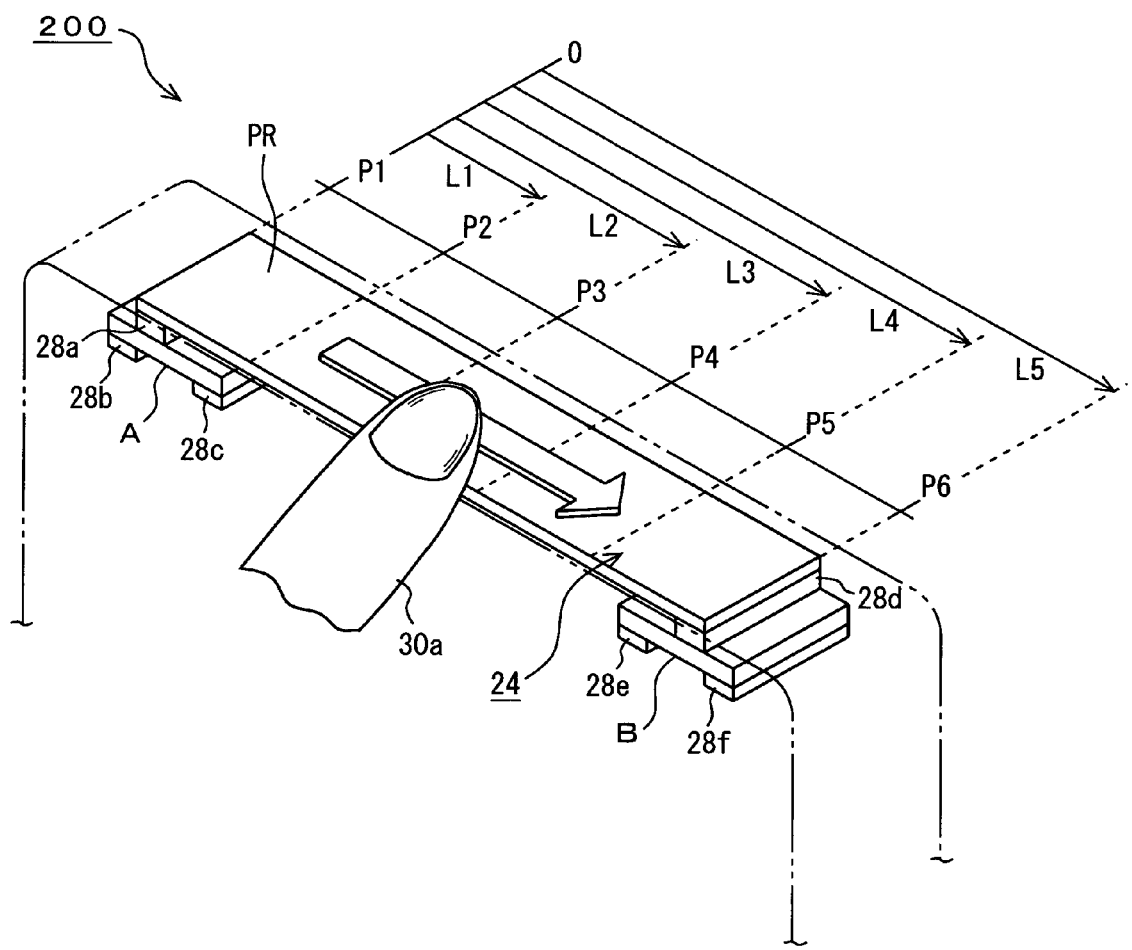

INPUT DEVICE HAVING TACTILE FUNCTION, INFORMATION INPUT METHOD, AND ELECTRONIC DEVICE

TECHNICAL FIELD

The present invention relates to an input device having a haptic function, an information input method, and an electronic device that are well applicable to a digital camera, information-processing apparatus, portable telephone, information portable terminal unit, etc. to which information is input by performing haptic operation on an input detection plane in a sliding manner. More specifically, it relates to those having vibration means for vibrating the input detection plane by using a vibration pattern computed on the basis of a haptic position by an operation body on this input detection plane and a sliding speed of this operation body, thereby enabling to be generated plural kinds of vibrations which have different period of vibration time (amplitude, frequency, and the number of times of vibrations) for each separate operator and which correspond to a sliding speed or a sliding lapse of time of the finger etc. of the operator, which is the operation body.

BACKGROUND ART

Recently, users (operators) have come to photograph a subject by using a digital camera having many kinds of operation modes and to take various contents into a portable terminal unit such as a portable telephone or a personal digital assistant (PDA) and utilize the contents. These digital camera, portable terminal unit, etc. each has an input device. As the input device, a keyboard and a touch panel having both of input means such as a JOG dial and display portion and the like are used in many cases.

As for this kind of digital camera, portable terminal unit, etc., a portable information terminal and programs therefor have been disclosed in Patent Literature 1 of Japan (Japanese Patent Application Laid Open Publication No. 2003-256120, pp. 2-3, FIG. 1). This portable information terminal has a display portion on its terminal unit body and a JOG dial at approximately middle of the body. The JOG dial is provided at a position different from that of the display portion. This JOG dial is rotated clockwise or counterclockwise so that an image on the display portion may be rotated as interlocked with this rotation. Moreover, by pressing the JOG dial toward the body, an image range is changed. By configuring an information terminal in such a manner, a variety of kinds of operations can be performed more comfortably. That is, the JOG dial employs a mechanical structure so that the operator may be given a haptic sense synchronized with any changes in contents displayed on the display portion for each time when he or she selects an input item on the display portion.

Further, some other portable terminal units having a haptic input function has an input function-provided display portion that combines any ones of various types of touch panels and display portions. By this type of portable terminal unit, an operator selects an input item by directly touching an icon display position in a space of two dimensions other than a depth-wise direction of the display portion as viewed from the operator. In such a manner, the operator can perform an input operation through a contacting (inputting, getting a touch of) a variety of icons displayed on the display portion with a smaller eyeball movement than the JOG dial type, thus more directly selecting an input item.

It is to be noted that an electronic device relative to the past examples such as a digital camera, an information processing apparatus, a portable telephone, and an information portable terminal unit that are provided with a haptic input function have the following problems.

i. By a portable information terminal in which a display portion and a JOG dial are separated in arrangement as disclosed in Patent Literature 1, an operator can get only a single haptic sense generated by a mechanical structure, so that this haptic sense does not have a large impact on him or her presently.

ii. By an input function-provided portable terminal unit that combines any ones of various types of touch panels and display portions, when having selected an icon on the display portion, the operator cannot get a haptic sense synchronized with that selection.

iii. In this connection, in the case of configuring a haptic function-provided input device by combining a plurality of vibrators and input means so that a haptic sense may be obtained through an operation to straightly touch its input detection plane, it is predicted that mere combination of the mechanism of separately arranging a display portion and input means as disclosed in Patent Literature 1 and an input function that combines various types of touch panels and display portion will not give a sufficient haptic sense if the operator touches the input detection plane at different speeds.

DISCLOSURE OF THE INVENTION

A haptic function-provided input device related to the present invention is a device that performs touch operation to slide on an input detection plane. The input device has input detection means, which has the input detection plane, for detecting a touching position of an operation body and a sliding speed of the operation body, computation means for computing a vibration pattern based on the sliding speed detected by the input detection means, and vibration means for vibrating the input detection plane based on the vibration pattern computed by the computation means.

According to a haptic function-provided input device related to the present invention, on the assumption that performing touch operation to slide on an input detection plane, input detection means having the input detection plane detects a touching position of finger of an operator, which is one example of an operation body, and a sliding speed of this finger. Computation means computes vibration patterns based on the sliding speed of the finger etc. of the operator detected by the input detection means.

For example, the computation means computes a vibration pattern of the input detection plane to generate vibrations from its low frequency and small amplitude to its high frequency and large amplitude, as the operation body goes away from a position where it has touched the input detection plane. Therefore, it is possible to generate plural kinds of vibrations which have different vibration patterns (amplitude, frequency, and vibration times) for each operator and which correspond to a sliding speed or a sliding lapse of time of the finger of the operator.

An information input method related to the present invention is a method for inputting information by performing touch operation to slide on an input detection plane. The method has the steps of detecting a touched position and a sliding speed of an operation body that touches the input detection plane, computing a vibration pattern based on the touched position and the sliding speed that are detected, and vibrating the input detection plane based on the computed vibration pattern.

According to the information input method related to the present invention, in a case of inputting information by performing touch operation to slide on an input detection plane, it is possible to generate plural kinds of vibrations which have different vibration patterns for each operator and which correspond to a sliding speed or a sliding lapse of time of the finger etc. of the operator, which is the operation body.

An electronic device related to the present invention is an electronic device having a haptic function-provided input device that performs touch operation to slide on an input detection plane and display means for displaying a display image based on information input by the input device. The input device includes input detection means, which has the input detection plane, for detecting a touching position of an operation body and a sliding speed of the operation body, computation means for computing a vibration pattern based on the sliding speed detected by the input detection means, and vibration means for vibrating the input detection plane based on the vibration pattern computed by the computation means.

According to the electronic device related to the present invention, the haptic function-provided input device related to the present invention is applied thereto, so that in the case of inputting information by performing touch operation to slide on an input detection plane, it is possible to generate plural kinds of vibrations which have different vibration patterns for each operator and which correspond to a sliding speed or a sliding lapse of time of the finger etc. of the operator, which is the operation body.

BRIEF DESCRIPTION OF THE DRAWINGS

FIG. 4 is a block diagram for showing an internal configuration of the digital camera 100;

FIG. 5 is a perspective view of an input detection section 24 for showing an example of operation thereof;

FIG. 6A is a diagram for showing an example of setting input positions P1-P5 on the input detection section 24;

FIG. 6B is a drawing for showing an example of a relationship between the input detection section 24 and input points P1-P5;

FIG. 7A is a drawing for showing an example of setting input positions P1-P5 in operation case I;

FIG. 7B is a drawing for showing an example of a vibration pattern at time point $Tp2+T\alpha$ between input positions P2 and P4 in operation case I;

FIG. 7C is a drawing for showing an example of a vibration pattern at time point $Tp2+T\alpha+T\beta$ between input positions P2 and P4 in operation case I;

FIG. 7D is a drawing for showing an example of a vibration pattern at time point $Tp2+T\alpha+2XT\beta$ between input positions P2 and P4 in operation case I;

FIG. 7E is a drawing for showing an example of a vibration pattern at time point $Tp2+T\alpha+3XT\beta$ between input positions P2 and P4 in operation case I;

FIG. 7F is a drawing for showing an example of a vibration pattern at time point $Tp2+T\alpha+4XT\beta$ between input positions P2 and P4 in operation case I;

FIG. 7G is a drawing for showing an example of a haptic image between input points P2 and P4 in operation case I;

FIG. 8A is a drawing for showing an example of setting input positions P1-P5 in operation case II;

FIG. 8B is a drawing for showing an example of a vibration pattern at time point $Tp2+T\alpha$ between input positions P2 and P4 in operation case II;

FIG. 8C is a drawing for showing an example of a vibration pattern at time point $Tp2+T\alpha+T\beta$ between input positions P2 and P4 in operation case II;

FIG. 8D is a drawing for showing an example of a vibration pattern at time point $Tp2+Tx+2XT\beta$ between input positions P2 and P4 in operation case II;

FIG. 8E is a drawing for showing an example of a vibration pattern at time point $Tp2+T\alpha+3XT\beta$ between input positions P2 and P4 in operation case II;

FIG. 8F is a drawing for showing an example of a vibration pattern at time point $Tp2+T\alpha+4XT\beta$ between input positions P2 and P4 in operation case II;

FIG. 8G is a drawing for showing an example of a haptic image between input points P2 and P5 in operation case II;

FIG. 9A is a drawing for showing an example of a vibration pattern to an actuator 25*e* when a sliding speed is V1, related to a conventional method;

FIG. 9B is a drawing for showing an example of a vibration pattern to another actuator 25*f* when the sliding speed is V1, related to the conventional method;

FIG. 9C is a drawing for showing an example of a long lapse of time of touching an input detection section related to the conventional method;

FIG. 9D is a drawing for showing an example of a vibration pattern to the actuator 25*e* when the sliding speed is V2, related to the conventional method;

FIG. 9E is a drawing for showing an example of a vibration pattern to another actuator 25*f* when the sliding speed is V2, related to the conventional method;

FIG. 9F is a drawing for showing an example of a short lapse of time of touching the input detection section related to the conventional method;

FIG. 10A is a drawing for showing an example of a vibration pattern to an actuator 25*e* when the sliding speed Vx=V1, related to a method of the present invention;

FIG. 10B is a drawing for showing an example of a vibration pattern to another actuator 25*f* when the sliding speed is Vx=V1, related to the method of the present invention;

FIG. 11A is a drawing for showing an example of setting input positions P1-P5 at the time of a sliding speed of V1 when finger moves slow according to the method of the present invention and the conventional method;

FIG. 11B is a drawing for showing an example of a haptic image at the time of the sliding speed of V1 according to the method of the present invention and the conventional method;

FIG. 11C is a drawing for showing an example of setting input positions P1-P5 at the time of a sliding speed of V2 when the finger moves fast according to the method of the present invention and the conventional method;

FIG. 11D is a drawing for showing an example of a haptic image at the time of the sliding speed of V2 according to the conventional method;

FIG. 11E is a drawing for showing an example of a haptic image at the time of the sliding speed of V2 according to the method of the present invention;

FIG. 12B is a conceptual diagram for showing an example of image display during zoom-in;

FIG. 12C is a conceptual diagram for showing an example of image display after zoom-in;

FIG. 15 is a flowchart (subroutine) showing a processing example in the zoom-in mode; and FIG. 16 is a perspective view of a digital camera 200 according to a second embodiment for illustrating an example of a haptic function-provided input mechanism used therein.

BEST MODE FOR CARRYING OUT THE INVENTION

The present invention has solved the conventional problems, and it is an object of the present invention to provide a haptic function-provided input device, an information input method, and an electronic device that enable to be generated plural kinds of vibrations which have different vibration times for each operator and which correspond to a sliding speed or a lapse of sliding time of the finger etc. of the operator.

The following will describe one embodiment of the haptic function-provided input device, the information input method, and the electronic device related to the present invention.

First Embodiment

In the first embodiment, vibration means for vibrating an input detection plane in accordance with a vibration pattern computed based on a touch position and a sliding speed of an operation body on this input detection plane is provided, thereby enabling to be generated plural kinds of vibrations which have different periods of vibration time (frequency, amplitude, and the number of times) for each operator and which correspond to a sliding speed or a lapse of sliding time of the finger etc. of the operator, which is the operation body.

Figure 1:
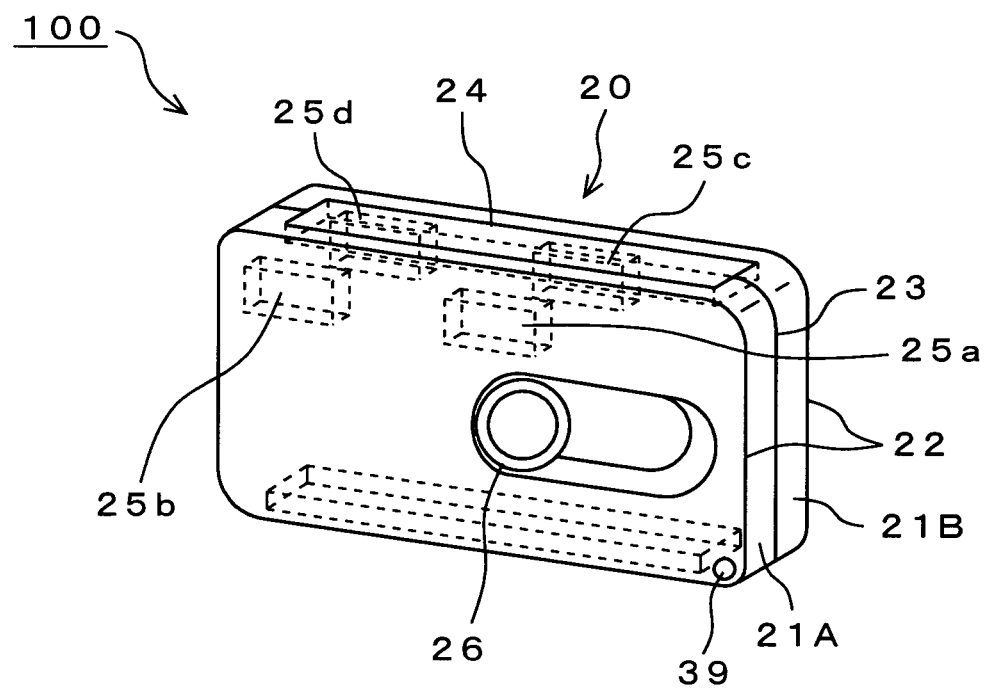
FIG. 1 is a perspective view of a digital camera 100 for illustrating a configuration thereof to which a haptic function-provided input device according to each of the embodiments of the present invention is applied.

A digital camera 100 shown in FIG. 1 is one example of electronic devices to which a haptic function-provided input device related to the present invention is applied. This digital camera 100 has a camera body 20. The camera body 20 is constituted of a chassis 22. The chassis 22 is assembled by causing a front case 21A and a rear case 21B that are roughly box-shaped to abut against each other with a roughly square-shaped shock absorber 23 made of rubber being sandwiched between openings of these respective cases.

On an upper face plate of the chassis 22, an input detection section 24 constituting a haptic function-provided input device (input detection means) is mounted. The input detection section 24 has the input detection plane and is operated in a slide input mode. The slide input mode is referred to as an operation to perform any touch input to slide on an input detection plane when switching modes such as a playback/fast-forward mode, a zoom-out mode, a zoom-in mode, and a volume adjustment mode. As In this embodiment, besides the slide input mode, other processing modes are prepared. In these other modes, a shutter button operation mode, an erasure button operation mode, a power source button operation mode, an operation mode to switch between a standard mode and a snap mode, etc. are included. As the input detection section 24, a rectangular electrostatic input sheet is used.

Inside the front case 21A, along a longitudinal direction of the input detection section 24, actuators 25a and 25b constituting the vibration means are provided with a predetermined spacing therebetween and configured to vibrate the input detection plane based on a desired vibration pattern. Similarly, inside the rear case 21B, along a longitudinal direction of the input detection section 24, actuators 25c and 25d are provided with a predetermined spacing therebetween and configured to vibrate the input detection plane based on the desired vibration pattern. In the present embodiment, the actuators 25a and 25c are faced to each other and the actuators 25b and 25d are faced to each other. This forces the vibrations to be made strong.

Besides, the front case 21A mounts a lens 26, shown in FIG. 1, to have a zoom function so that an image of a subject may be formed when photographing the subject. Further, at the right corner of the front case 21A, an external interface terminal 39 is provided to connect an external device to which any information can be transferred.

Figure 2:
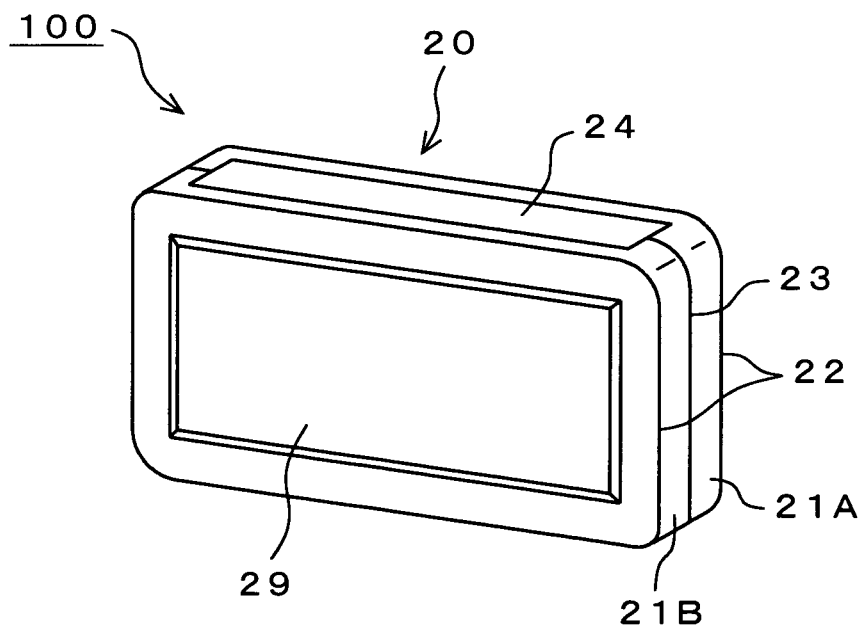
FIG. 2 is a perspective view of a camera body 20 for illustrating a configuration of a rear thereof.

The rear case 21B shown in FIG. 2 is provided with a display portion 29 to display an image to be displayed on the basis of information input by the input detection section 24. The display portion 29 is configured to perform a monitor function as well as other functions such as a finder function. As the display portion 29, a liquid crystal display (LCD) is used which has a resolution of about 640 pixels by 480 pixels.

Figure 3A:
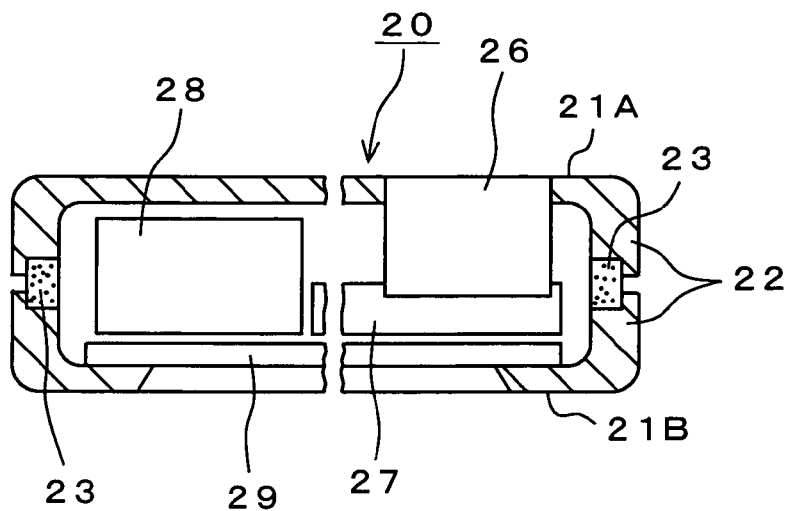
FIG. 3A is a cross-sectional view of the camera body 20 for illustrating a configuration thereof as viewed from a bottom thereof.
Figure 3B:
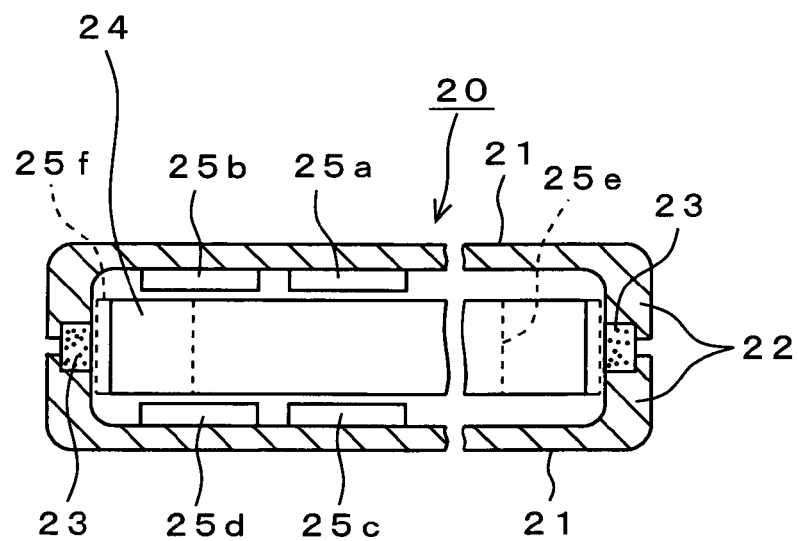
FIG. 3B is a cross-sectional of the camera body 20 for illustrating a configuration thereof as viewed from a top thereof.

As can be seen from a bottom of the camera body 20 shown in FIG. 3A, besides the lens 26 and the display portion 29, substrate mounting components 27 and a battery 28 are mounted inside the chassis 22. As can be seen from a top of the camera body 20 shown in FIG. 3B, the input detection section 24 and the actuators 25a-25f are mounted inside the chassis 22. The input detection section 24 shown in FIG. 3B is constituted of an electrostatic capacitive input sheet. One sheet of electrostatic capacitive input sheet is constituted of a roughly rectangular sheet, so that by pressing a plurality of predetermined positions of this electrostatic capacitive sheet, the above-described mode buttons function respectively.

In the present embodiment, at right and left positions under the input detection section 24, besides the actuators 25a-25d mounted inside the front case 21A and the rear case 21B, the actuators 25e and 25f are also mounted to vibrate the input detection plane based on a desired vibration pattern so that vibrations may propagate to, for example, an operation direction. Each of the actuators 25a-25f is constituted of a piezoelectric sheet or a piezoelectric element.

Next, a haptic function-provided input device, the digital camera 100, and a haptic feedback input method in the digital camera 100 of the present invention will be described. FIG. 4 is a block diagram for showing an internal configuration of the digital camera 100, indicating blocks of important sections of the functions constituted of the substrate mounting components 27 etc. in the chassis shown in FIGS. 1, 2, and 3A, and 3B. Like components in FIGS. 4 and 2 are indicated by the same symbols.

The digital camera 100 shown in FIG. 4 is provided with the input detection section 24, the display portion 29, an A/D driver 31, a CPU 32, a power source unit 33, a camera 34, other devices 35, a speaker 36, and a vibration section 40.

The input detection section 24 has the input detection face as shown in FIG. 2 etc. and is configured to detect a touch position by the finger 30a of the operator as the operation body and a degree of sliding (moving speed) of the finger 30a of this operator. Although, in FIG. 2, an electrostatic capacitive input device has been described as the electrostatic capacitive sheet as for this input detection section 24, the present invention is not limited to that; any device may be used as far as it can distinguish between a cursoring and a selection function.

For example, the input detection section 24 may be an input device such as a resistance film typed one, a surface acoustic wave (SAW) typed one, an optical typed one, or a multiple-stage typed tact switch. Preferably, any input device may be used as far as it is configured to be able to give position information and force information to the CPU 32. The above-described input detection section 24 is supplied with at least position information S1 and force information S2 (pressing force), which provides an input quantity, via the operator's finger 30a.

The display portion 29 is configured to display an image to be displayed based on information input by the input detection section 24. The display portion 29 is set to perform a monitor function as well as such functions as a finder function. For example, the display portion 29 displays icons of the zoom-in mode, the zoom-out mode, the playback/fast-forward mode, the volume (Vol) adjustment mode, etc. based on control information (command D) from the CPU 32.

The input detection section 24 has the A/D driver 31 connected thereto, to receive the position information S1 and the input quantity S2 output from the input detection section 24 and perform analog-to-digital conversion thereof. For example, the A/D driver 31 converts an analog signal comprised of the position information S1 and the input quantity S2 into digital data in order to distinguish between the cursoring and the selection function. Along with it, the A/D driver 31 detects, through computation, which is cursoring input or selection information and supplies the CPU 32 with data D3 constituted of a flag indicating either cursoring or selection, position detection data D1 or input quantity data D2. Those computations may be performed in the CPU 32.

The A/D driver 31 is connected with the CPU 32 which is one example of computation means, and receives an input signal from the A/D driver 31 and supplies a command D to devices of the power source unit 33, the camera section 34, the other devices 35, the display portion 29, the speaker 36, and an actuator drive circuit 37.

For example, the CPU 32 has a function (algorithm) to process a sine waveform generated in the actuator drive circuit 37 by using a sliding speed of an operator 30 as a parameter in the same vibration mode. The CPU 32 is configured to compute a vibration pattern based on the sliding speed detected by the input detection section 24. In the present embodiment, the CPU 32 computes a vibration pattern of the input detection plane such that as the finger 30a of the operator goes away from a point where it has touched the input detection plane originally, the input detection plane can generate vibration pattern from low frequency and small amplitude to high frequency and large amplitude.

Further, the CPU 32 constitutes control means, and conducts variable control on input information based on the sliding speed. For example, the CPU 32 conducts such a control as to set a larger quantity of input information when the operator's finger has been slid faster than a quantity of input information when it has been slid at a standard sliding speed.

The vibration section 40 is constituted of the actuator drive circuit 37 and the actuators 25a-25f, to vibrate the input detection plane based on a vibration pattern computed by the CPU 32 in such a manner that vibrations may propagate to an operation direction thereof. The above-described CPU 32 is connected to the actuator drive circuit 37 to generate vibration control signals Sa-Sf in accordance with each command D from the CPU 32 and supply the plural actuators 25a, 25b, 25c, 25d, 26e, and 26f with the vibration control signals Sa-Sf. The vibration control signals Sa-Sf have, for example, output waveforms W1-W3, . . . with sine wave shape. This enables to be driven the six actuators 25a-26f.

Further, the CPU 32 is connected to the camera 34 to photograph a subject through the above-described lens 26 in accordance with the command D. As the camera 34, an imaging device (CCD), not shown, is used to output photographed data obtained through photographing of the subject.

The other devices 35 include a storage device, an external terminal, etc. For example, the storage device stores photographed data and reads this photographed data in accordance with the command D from the CPU 32. The external terminal includes the external interface terminal 39 shown in FIG. 1, to output the command D from the CPU 32 to an external device such as a printer so that a printer mode, not shown, may be activated. The speaker 36 produces icon confirmation sound or device-handling announcing sound in accordance with the command D from the CPU 32.

The power source unit 33 is connected to the battery 28 described earlier and supplies power to the input detection m section 24, the display portion 29, the A/D driver 31, the CPU 32, the camera 34, the other devices (storage device, external terminal, etc.) 35, the vibration section 40, etc.

By configuring the digital camera 100 as the above, it is possible to generate plural kinds of vibrations which correspond to a sliding speed or a lapse of sliding time of the operator's finger 30a and which have different vibration patterns (amplitude, frequency, and vibration times) for each operator. The operator 30 senses function-specific vibrations from the CPU as a haptic sense when having received vibrations through his or her finger 30a. Also, contents displayed on the display portion 29 are utilized so that each function can be decided through visual perception by operator's eyes and a sound produced by speaker 36 is utilized so that each function can be decided through auditory perception of his ears.

Next, an operation example will be described in which the operator gets a haptic sense from the camera body 20 with him or her sliding his or her finger 30a on the input detection plane. FIG. 5 is a perspective view of the input detection section 24 for showing an example of operation on the input detection section 24, in which a portion of the operator's finger 30a is expanded.

In the present embodiment, the input detection section 24 shown in FIG. 5 has an input detection plane PR and is operated in such a manner that the operator's finger 30a may be slid (go over) on this input detection plane PR at a predetermined speed from, for example, a left bottom portion to a right top portion in the figure in a condition where that the finger 30a is in contact with that face PR through constant force. The input detection plane PR is defined to be a region enclosed by a broken line including an upper of the chassis to which the input detection section 24 is projected.

In the present embodiment, on the right and left sides of the input detection section 24 shown in FIG. 6A, the actuators 25f and 25e are respectively provided. The input detection section 24 and the actuators 25a, 25b, 25e, 25f, etc. are all fixed to the chassis 22 by adhesive 27. As the input detection section 24, an electrostatic capacitive sheet (touch panel) and the like are used to detect a sliding speed of the operator's finger 30a.

In FIG. 6B, five points of positions P1-P5 are set on the input detection plane PR. In the present embodiment, an example is employed in which one end of the input detection section 24 is arranged between positions P1 and P2 and the other end of the input detection section 24 is arranged between positions P4 and P5. The operator goes over the input detection plane PR at a sliding speed Vo in a direction from position P1 to position P5. In this case, the CPU 32 calculates a rate of change Vx, which is detected by the input detection section 24, in input positions P1 through P5 on a time axis thereof, that is, a sliding speed Vx of the operator's finger 30a.

In the present embodiment, the input detection section 24 prepares beforehand a haptic waveform Wo when a standard rate of change in input positions P1 through P5 along the time axis (basic time axis) thereof, that is, a standard sliding speed of the operator's finger 30a is set to Vo. Table 1 shows contents of the haptic waveform Wo with respect to the standard sliding speed Vo (rate of change Vo in position).

TABLE 1

| haptic waveform Wo with respect to rate of change Vo in position along a basic time axis | |
|---|---|
| Frequency fx | H1, H2, H3, H4, . . . |
| Amplitude Ax | A1, A2, A3, A4, . . . |
| The number of times Nx | n1, n2, n3, n4, . . . |

In Table 1, fx indicates a frequency of the haptic waveform Wo, Ax indicates its amplitude, and Nx indicates the number of times (of its waves). At the first stage of a vibration pattern, the haptic waveform Wo has a frequency fx=H1[Hz], an amplitude Ax=A1[μm], the number of times Nx=n1. Similarly, at the second stage thereof, it has fx=H2, the amplitude Ax=A2, and the number of times Nx=n2; at the third stage thereof, it has fx=H3, the amplitude Ax=A3, and the number of times Nx=n3; at the fourth stage thereof, it has fx=H4, the amplitude Ax=A4, and the number of times Nx=n4, . . . , where units are omitted.

Further, in the present embodiment, a sliding speed Vx in a case where the finger goes over on the input detection plane PR at the standard sliding speed Vo or slower (V1≦Vo), namely, a detected time axis, is set equal to V1 (Vx=V1). This is defined to be operation case I. Table 2 shows contents of a haptic waveform Wv with respect to sliding speed V1 (rate of change V1 in position).

TABLE 2

| haptic waveform Wv with respect to rate of change Vx in position along a detected time axis | |
|---|---|
| Frequency fx | H1, H2, H3, H4, . . . |
| Amplitude Ax | A1, A2, A3, A4, . . . |
| The number of times Nx | $n1 \cdot \frac{V0}{Vx}, n2 \cdot \frac{V0}{Vx}, n3 \cdot \frac{V0}{Vx}, n4 \cdot \frac{V0}{Vx}, \ldots$ |

In the operation case I shown in Table 2, fx indicates a frequency of the haptic waveform Wv, Ax indicates its amplitude, and Nx indicates the number of times of its waves. At the first stage of a vibration pattern, the haptic waveform Wv has a frequency fx=H1[Hz], an amplitude Ax=A1[μm], the number of times Nx=n1·Vo/Vx. Similarly, at the second stage thereof, it has fx=H2, the amplitude Ax=A2, and the number of times Nx=n2·Vo/Vx; at the third stage thereof, it has fx=H3, the amplitude Ax=A3, and the number of times Nx=n3·Vo/vx; at the fourth stage thereof, it has fx=H4, the amplitude Ax=A4, and the number of times Nx=n4·Vo/Vx, . . . , where units are omitted.

Furthermore, in the present embodiment, a sliding speed Vx in a case where the finger goes over faster than the standard sliding speed Vo (V2>Vo) is set equal to V2 (V1<V2). This is defined to be operation case II. Table 3 shows contents of the haptic waveform Wv with respect to the sliding speed V2.

TABLE 3

| haptic waveform Wv when Nx > (Vo/Vx) | |
|---|---|
| Frequency fx | H1, H2, H3, H4, . . . |
| Amplitude Ax | A1, A2, A3, A4, . . . |
| The number of times Nx | 1, 1, 1, 1, . . . |

In Table 3, fx indicates a frequency of the haptic waveform Wv, Ax indicates its amplitude, and Nx indicates the number of times of its waves. In this case, however, these contents are employed only when at least one of the number of times Nx=n1·Vo/Vx, Nx=n2·Vo/Vx, Nx=n3·Vo/Vx, Nx=n4·Vo/Vx, . . . takes a value below one (1). At the first stage of a vibration pattern, the haptic waveform Wv has a frequency fx=H1[Hz], an amplitude Ax=A1[μm], and the number of times Nx=1. Similarly, at the second stage thereof, it has fx=H2, the amplitude Ax=A2, and the number of times Nx=2; at the third stage thereof, it has fx=H3, the amplitude Ax=A3, and the number of times Nx=3; at the fourth stage thereof, it has fx=H4, the amplitude Ax=A4, and the number of times Nx=4, . . . , where units are omitted.

In this case, if the number of times Nx is set to nx·Vo/Vx (x=1, 2, 3, 4, . . . ) when distinguishing between the operation cases I and II, the CPU 32 decides whether nx·Vo/Vx≧1 with respect to the standard sliding speed Vo. By using a result of this decision, the digital camera 100 can generate plural kinds of haptic senses having the same haptic image but different periods of vibration time in the same vibration mode.

Next, an example of a vibration pattern and an example of a haptic image in the operation case I will be described. Along a horizontal axis shown in FIG. 7A, input positions P1-P5 related to operation case I are given. Vertical axes shown in FIG. 7B-7G all give amplitude Ax and horizontal axes thereof all give time t. Each graduation of the time axis corresponds to 0.1 [s]. Each graduation of the input position axis corresponds to 1 cm. This example exemplifies the case of moving from input positions P1 to P5 by taking 2 [s], that is, the case of moving over a distance of all sections of 4 cm at a sliding speed of 2 cm/s (operation case I).

FIG. 7A shows the operation case I, that is, a case where the operator's finger 30a has gone over the input detection plane PR at a sliding speed of V1 of the operator's finger 30a that is the standard sliding speed Vo or slower (V1≦Vo). In this case, during a lapse of time when the operator's finger 30a moves from input positions P1 to P3, the input detection section 24 detects the sliding speed V1 of the operator's finger 30a.

Based on a rate of change Vx with respect to the time axis in the input positions P1-P5, which is detected by the input detection section 24, the CPU 32 detects and recognizes that a sliding speed of V1=2cm/s at which the operator's finger 30 has gone over the input detection plane PR is the same as the standard speed Vo or slower than that (V1≦Vo). If having detected operation case I, the CPU 32 supplies the actuator drive circuit 37 with such a command D (control information) as to generate the vibration pattern shown in Table 2.

In FIG. 7B showing a vibration pattern example at TP2+Tα, TP2 indicates an input detection time when the input detection section 24 detects an input position P2. In FIG. 7B, Tα indicates a vibration delay time, that is, a time lag from input detection time TP2 to excitation-starting time. In this case, it is about 0.1 s.

At this input detection time TP2, the actuator drive circuit 37 shown in FIG. 4 outputs such vibration control signals Sa-Sf as to generate the vibration pattern shown in Table 2 based on the command D. The actuator 25a is supplied with the vibration control signal Sa; the actuator 25b is supplied with the vibration control signal Sb; the actuator 25c is supplied with the vibration control signal Sc; the actuator 25d is supplied with the vibration control signal Sd; the actuator 25e is supplied with the vibration control signal Se; and the actuator 25f is supplied with the vibration control signal Sf, respectively.

Of course, this invention is not limited to this; for example, drive signals of four patterns may be supplied such that the actuators 25a and 25c are supplied with the vibration control signal Sa having the same contents; the actuators 25b and 25d are supplied with the vibration control signal Sb; the actuator 25e is supplied with the vibration control signal Sc; and the actuator 25f is supplied with the vibration control signal Sd.

The actuators 25a-25f vibrate for about 0.8 s based on the vibration control signals Sa-Sd. Specifically, in the vibration waveform shown in FIG. 7B, they vibrate in accordance with a vibration pattern having frequency fx=50 Hz, amplitude Ax=5 μm, and the number of times Nx=10 for about 0.2 s at the first stage i thereof. Hereinafter, this pattern is described as [fx Ax Nx]=[50 5 10]. Similarly, they vibrate in accordance with vibration pattern [fx Ax Nx]=[100 10 20] for about 0.2 s at the second stage ii thereof too. At the third stage iii thereof too, they vibrate in accordance with vibration pattern [fx Ax Nx]=[200 20 40] for about 0.2 s. At the fourth stage iv thereof too, they vibrate in accordance with vibration pattern [fx Ax Nx]=[400 30 80] for about 0.2 s.

Further, in FIG. 7C showing a vibration pattern example at TP2+Tα+Tβ, Tβ indicates vibration propagation delay time, that is, slight delay time with respect to the vibration delay time Tα. That is, in a vibration pattern constituted of the first through fourth stages i-iv shown in FIG. 7C, vibration propagates later than that of FIG. 7B by the vibration propagation delay time Tβ.

Further, relative to FIG. 7D showing a vibration pattern example at TP2+Tα+2XTβ, in a vibration pattern constituted of the first through fourth stages i-iv, vibration propagates later than that of FIG. 7C further by the vibration propagation delay time Tβ. Relative to FIG. 7E showing a vibration pattern example at TP2+Tα+3XTβ, in a vibration pattern constituted of the first through fourth stages i-iv, vibration propagates later than that of FIG. 7D further by the vibration propagation delay time Tβ.

Relative to FIG. 7F showing a vibration pattern example at TP2+Tα+4XTβ, in a vibration pattern constituted of the first through fourth stages i-iv, vibration propagates later than that of FIG. 7E further by the vibration propagation delay time Tβ.

According to a haptic image obtained through the operator's finger 30a in operation case I shown in FIG. 7G, in a period of time when the finger moves from input positions P2 to P4, it is possible to obtain a haptic sense based on the vibration patterns shown in FIGS. 7B-7F. At the input position P2, in about 0.2 s of its first stage i, the haptic sense based on the vibration pattern [fx Ax Nx]=[50 5 10] is obtained and in about 0.2 s of its second stage ii, the haptic sense based on the vibration pattern [fx Ax Nx]=[100 10 20] is obtained, and in about 0.2 s of its following third stage iii, the haptic sense based on the vibration pattern [fx Ax Nx]=[200 20 40] is obtained and in about 0.2 s of its fourth stage iv, the haptic sense based on the vibration pattern [fx Ax Nx]=[400 30 80] is obtained.

Next, an example of a vibration pattern and an example of a haptic image in operation case II will be described. Along a horizontal axis shown in FIG. 8A, input positions P1-P5 in operation case II are given.

Vertical axes shown in FIG. 8B-8G all give amplitude Ax and horizontal axes thereof all give time t. Each graduation of the time axis corresponds to 0.1[s]. Each graduation of the input position axis corresponds to 1 cm. This example exemplifies the case of moving from the input position P1 to the input position P2 by taking 0.5[s], moving from the input position P2 to the input position P4 by taking 0.5 s, and moving from the input position P4 to the input position P5 by taking 0.5 s again, that is, the case of moving over a distance from input position P1 to the input position P2 at a sliding speed of 2 cm/s, a distance from the input position P2 to the input position P4 at a sliding speed of 4 cm/s, and a distance from input position P4 to the input position P5 at a sliding speed of 2.0 cm/s again of a moving distance of all sections of 4 cm (operation case II).

FIG. 8A shows the operation case II, that is, a case where a sliding speed V2 of the operator's finger 30a at which the operator's finger 30a has gone on the input detection plane PR is faster than the standard sliding speed Vo (V2>Vo). In this case too, during a lapse of time when the operator's finger 30a moves from input positions P1 to P3, the input detection section 24 detects a sliding speed V2 of the operator's finger 30a.

Based on a rate of change Vx in input positions P1-P5 with respect to the time axis detected by the input detection section 24, the CPU 32 detects and recognizes that a sliding speed of V2=4cm/s of the operator's finger 30a at which the operator's finger 30a has gone on the input detection plane PR is faster than the standard speed Vo (V2≦Vo). If having detected operation case II, the CPU 32 supplies the actuator drive circuit 37 with the command D (control information) to generate the vibration pattern shown in Table 3.

Further, in FIG. 8B showing a vibration pattern example at TP2+Tα, TP2 indicates an input detection time when the input detection section 24 detects the input position P2. In FIG. 8B, Tα indicates vibration delay time, that is, a time lag from input detection time TP2 to excitation-starting time. In this case, it is about 0.1 s.

At this input detection time TP2, the actuator drive circuit 37 shown in FIG. 4 outputs such vibration control signals Sa-Sf as to generate the vibration pattern shown in Table 3 based on the command D. The actuator 25a is supplied with the vibration control signal Sa; the actuator 25b is supplied with the vibration control signal Sb; the actuator 25c is supplied with the vibration control signal Sc; the actuator 25d is supplied with the vibration control signal Sd; the actuator 25e is supplied with the vibration control signal Se; and the actuator 25f is supplied with the vibration control signal Sf, respectively.

The actuators 25a-25f vibrate the input detection plane for about 0.4 s based on the vibration control signals Sa-Sf. Specifically, in the vibration waveform shown in FIG. 8B, they vibrate in accordance with a vibration pattern having a frequency fx=50 Hz, amplitude Ax=5 μm, and the number of times Nx=5 for about 0.1 s at the first stage i thereof. Hereinafter, this pattern is described as [fx Ax Nx]=[50 5 5]. Similarly, they vibrate in accordance with vibration pattern [fx Ax Nx]=[100 10 10] for about 0.1 s at the second stage ii thereof too. At the third stage iii thereof too, they vibrate in accordance with vibration pattern [fx Ax Nx]=[200 20 20] for about 0.1 s. At the fourth stage iv thereof too, they vibrate in accordance with vibration pattern [fx Ax Nx]=[400 30 40] for about 0.1 s.

Further, in FIG. 8C showing a vibration pattern example at TP2+Tα+Tβ, Tβ indicates vibration propagation delay time, that is, slight delay time with respect to the vibration delay time Tα. That is, in the vibration pattern constituted of the first through fourth stages i-iv shown in FIG. 8C, vibration propagates later than that of FIG. 8B by the vibration propagation delay time Tβ.

Relative to FIG. 8D showing a vibration pattern example at TP2+Tα+2XTβ, in a vibration pattern constituted of the first through fourth stages i-iv, vibration propagates later than that of FIG. 8C further by the vibration propagation delay time Tβ. Further, relative to FIG. 8E showing a vibration pattern example at TP2+Tα+3XTβ, in a vibration pattern constituted of the first through fourth stages i-iv, vibration propagates later than that of FIG. 8D further by the vibration propagation delay time Tβ. Relative to FIG. 8F showing a vibration pattern example at TP2+Tα+4XTβ, in a vibration pattern constituted of the first through fourth stages i-iv, vibration propagates later than that of FIG. 8E further by the vibration propagation delay time Tβ.

According to a haptic image obtained through the operator's finger 30a in operation case II shown in FIG. 8G, in a period of time when the finger moves from input positions P2 to P4, it is possible to obtain a haptic sense based on the vibration patterns shown in FIGS. 8B-8F. At the input position P2, in about 0.1 s of its first stage i, the haptic sense based on the vibration pattern [fx Ax Nx]=[50 5 5] is obtained and in about 0.1 s of its second stage ii, the haptic sense based on the vibration pattern [fx Ax Nx]=[100 10 10] is obtained, and in about 0.1 s of its following third stage iii, the haptic sense based on the vibration pattern [fx Ax Nx]=[200 20 20] is obtained and in about 0.1 s of its fourth stage iv, the haptic sense based on the vibration pattern [fx Ax Nx]=[400 30 40] is obtained.

Accordingly, in a case where the finger 30a moves on the input detection plane PR faster than the standard sliding speed Vo, in the conventional method, the third and fourth stages iii and iv go dead, however, in the embodiment of the present invention, no stage goes dead, so that such a haptic image as shown in FIG. 8G can be obtained.

FIGS. 9A-9F, FIG. 10A-10B, and FIGS. 11A-11E show a comparison example in which the method of the present invention for obtaining such a haptic sense as shown in FIG. 8G is compared with the conventional method.

This comparison example exemplifies a case where the input detection section 24 and the actuators 25e and 25f are T5 provided in the same plane such as shown in FIG. 6A. In this case, when performing a mode (hereinafter referred to as "vibration mode") in which a "vibration direction" is transmitted by using the two actuators 25e and 25f, a case to which the method of the present invention is applied for reflecting a sliding speed Vx on a waveform generation timing is compared to the case of the conventional method in which no vibration mode is performed. It is to be noted that explanation of vibration propagation delay time Tβ will be omitted.

In FIGS. 9A, 9B, 9D, and 9E, their vertical axes represent amplitude Ax of a vibration pattern due to the actuators 25e, 25f, etc. In FIGS. 9A-9E, their horizontal axes all represent time t. Further, in FIGS. 9A, 9B, 9DE, and 9E, T represents vibration time difference between the actuators 25e and 25f at the standard sliding speed Vo.

In this example, the vibration time difference T is set to a constant value no matter whether the sliding speed Vx of the operator's finger 30a is equal to, smaller than, or larger than the standard sliding speed Vo. That is, according to the conventional method, no matter whether the sliding speed Vx of the operator's finger 30a is equal to, smaller than, or larger than the standard sliding speed Vo, the actuator 25e vibrates first and then the actuator 25f vibrates with the vibration time difference T.

Therefore, if the sliding speed V1 of the operator's finger 30a is equal to or smaller than the standard sliding speed Vo, it is possible to obtain a haptic image constituted of the first stage i through the fourth stage iv as shown in FIG. 11B. However, according to the conventional method, if the sliding speed V2 of the operator's finger 30a exceeds the standard sliding speed Vo, that is, if the sliding speed V2 becomes larger than the sliding speed V1, it is possible to obtain a haptic image constituted of the first stage i and the second stage ii as shown in FIG. 1D; however, since the vibration time difference T between the third stage iii and the fourth stage iv is fixed, vibration waveforms of the third and fourth stages iii and iv are prevented from sufficiently propagating to the operator's finger 30a, thus disabling obtaining a haptic image.

According to the method of the present invention, one standard sliding condition is set. In this embodiment, a shift in excitation timing between the two actuators 25e and 25f at the standard sliding speed Vo, that is, at a standard time thereof is set to a vibration shift time t'. With respect to this, a vibration time difference T' between the actuators 25e and 25f varies in accordance with the sliding speed Vx of the operator's finger 30a as shown in FIGS. 10A and 10B.

The following will describe a vibration pattern when the sliding speed is Vx. In FIG. 10A, a vertical axis represents an amplitude Ax of the vibration pattern of the actuator 25e. In FIG. 10B, a vertical axis represents an amplitude Ax of the vibration pattern of the actuator 25f. Their horizontal axes both represent time t. In the figures, T' indicates vibration time difference and waveform rising time difference between the actuators 25e and 25f.

According to the method of the present invention, a sliding speed Vx of the operator's finger 30a at a given input position is detected and, by assuming a shift in excitation timing between the two actuators 25e and 25f at the time of this detection to be a vibration time difference T', discriminant T'=Vo·t'/Vx is introduced to decide whether operation case I or II is entered. Based on this decision on which one of operation cases I and II is entered, vibration patterns shown in FIGS. 2 and 3 are created.

Next, a haptic image in a case where the finger 30a moves slowly in the method of the present invention is compared with that of the conventional method. Further, a haptic image in a case where the finger 30a moves faster in the method of the present invention is compared with that of the conventional method.

According to the conventional method, if the sliding speed V2 of the operator's finger 30a exceeds the standard sliding speed Vo, that is, if the sliding speed V2 becomes larger than the sliding speed V1, vibration waveforms of the third and fourth stages iii and iv is prevented from sufficiently propagating to the operator's finger 30a because the vibration time difference T between the actuators 25e and 25f is fixed, so that a dead portion 80 occurs, thus disabling obtaining a haptic image.

In contrast, according to the method of the present invention, the vibration time difference T' varies in conjugation with the standard sliding speed Vo as described in FIGS. 10A and 10B, so that even if the sliding speed V2, which represents movements of the operator's finger 30a, exceeds the standard speed Vo, that is, even if the sliding speed V2 is larger than the sliding speed V1, as shown in FIGS. 11E and 8G, a haptic image of the first stage i through the second stage ii can be obtained and vibration waveforms propagate to the finger 30a of the operator sufficiently, thereby enabling to be obtained a haptic image of the third stage iii through the fourth stage iv.

Next, relative to an information input method according to the present invention, an information processing example in the digital camera 100 will be described with reference to FIGS. 12A-12C, 13A-13C, 14A-14D and 15.

In the present embodiment, relative to an example of information processing at the time of sliding operation in the digital camera 100, it is assumption that information is input by performing any touch operation to slide on an input detection plane of the input detection section 24.

Figure 12A:
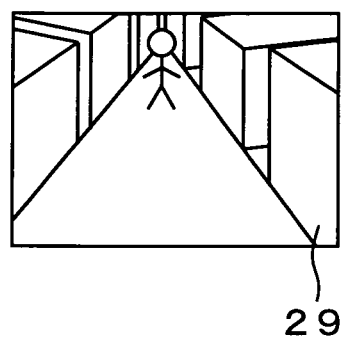
FIG. 12A is a conceptual diagram for showing an example of image display before zoom-in in a zoom-in mode.

In this embodiment, according to an example of image display shown in FIG. 12A, there are buildings on right and left sides of a road shown at a center of an image with a subject such as a person standing on of the road shown at the back center of the image when the sliding function is to be zoomed in.

In this example, if the input detection section 24 detects an amount of go-over distance over a set amount thereof, that is, if a relationship of X2−X1>x is satisfied where X1 is a coordinate value of an input start point; X2 is a coordinate value of a current point; and x is a control threshold value that represents a difference in coordinate values corresponding to the set amount of go-over distance 1 under the condition where an input is continuously provided, the CPU 32 causes the display portion 29 to display a zoom-in mode image having a size corresponding to the sliding speed Vx. In this case, the CPU 32 outputs the command D to the display portion 29, so that the displayed image shown in FIG. 12A can be switched on the display portion to a displayed image such as ones shown in FIG. 12B or 12C.

Figure 12B:
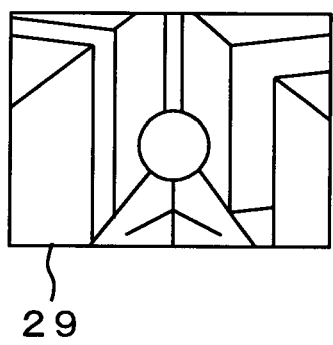

Further, according to an example of image display in halfway through zoom-in shown in FIG. 12B, if performing touch operation to slide on the input detection plane of the input detection section 24, for example, at the standard sliding speed Vo, after having felt a haptic sense, the operator 30 can confirm an image display of the buildings on the right and left sides of the road at the center of the image and the subject standing on the road and moving toward him or her.

Figure 12C:
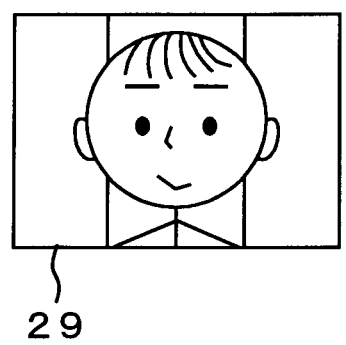

Further, according to an example of post-zoom-in image display shown in FIG. 12C, if performing a touch operation to slide on the input detection plane of the input detection section 24 at the sliding speed Vx=V2 that is faster than the standard sliding speed Vo, after having felt a haptic sense, the operator 30 can confirm an image display of the subject further moving toward him or her than a case shown in FIG. 12B. In this embodiment, it is possible to display a zoom-in mode image having a size corresponding to the speed, and to confirm a display of a close-up image of the face of the subject at the center of the displayed image.

Thus, by making the sliding speed Vx in sliding on the input detection plane larger than the standard sliding speed Vo, it is possible to control a size of an image to be zoomed in. The example of the information processing at the time of sliding operation in the digital camera 100 is not limited to the zoom-in mode but may be applied to the playback/fast-forward mode, the zoom-out mode, the reverse mode, the focus adjustment mode, the sound volume adjustment mode, the channel (CH) change mode, etc. It is to be noted that the digital camera 100 may be configured to be able to detect plural input position differences X2−X1 by one time of sliding or only one input position difference of X2−X1 by one time of sliding.

Next, an example of operations in the sound volume (Vol) adjustment mode will be described. In this example, in a case where a sliding function is set to "Vol adjustment", according to an example of image display before Vol adjustment shown in FIG. 13A, a sound volume adjustment bar 29a is displayed at a lower part of the image. The sound volume adjustment bar 29a has, for example, six adjustment frames in a direction from "−" toward "+". In the figures, a first adjustment frame is indicated by hatching.

In this example, if the input detection section 24 detects an amount of a go-over distance over a set amount thereof, that is, if a relationship of X2−X1>x is satisfied where X1 is a coordinate value of an input start point; X2 is a coordinate value of a current point; and x is a control threshold value that is a difference in coordinate values corresponding to the set amount of go-over distance under a condition where an input is continuously provided, the CPU 32 causes the display portion 29 to display a sound volume adjustment image corresponding to the sliding speed Vx. In this case, the CPU 32 outputs the command D to the display portion 29, so that the image shown in FIG. 13A can be switched on the display portion to an image such as ones shown in FIG. 13B or 13C.

Figure 13A:
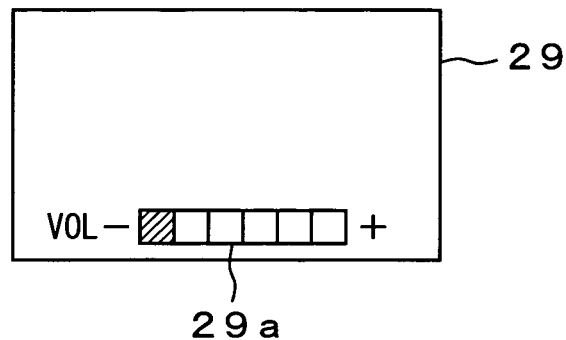
FIG. 13A is a conceptual diagram for showing an example of operations before adjustment in a volume adjustment mode.
Figure 13B:
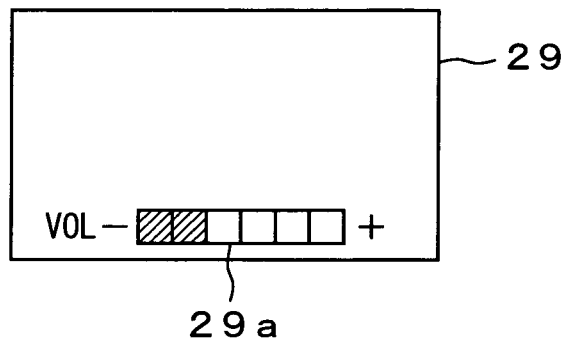
FIG. 13B is a conceptual diagram for showing an example of operations during adjustment.

For example, according to an example of image display in halfway through sound volume adjustment shown in FIG. 13B, if performing a touch operation to slide on the input detection plane of the input detection section 24 at the standard sliding speed Vo, after having felt a haptic sense, another "+" directional adjustment frame of the sound volume adjustment bar 29a at the lower part of the image is switched to a hatched frame. The CPU 32 outputs a command D to the speaker 36, to control the speaker 36 so that its sound volume may be increased by one step as compared to that of FIG. 13A.

Figure 13C:
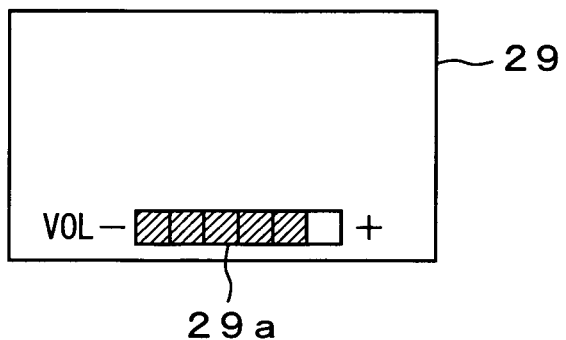
FIG. 13C is a conceptual diagram for showing an example of operations after adjustment.

Further, according to an example of image display after the sound-volume-adjustment shown in FIG. 13C, if performing a touch operation to slide on the input detection plane of the input detection section 24 at the sliding speed Vx=V2 that is larger than the standard sliding speed Vo, after having felt a haptic sense, the operator 30 can confirm such a display that a further "+" directional adjustment frame of the sound volume adjustment bar 29a is increased at the lower part of the image by a hatched one than one shown in FIG. 13B. In this case, the CPU 32 outputs the command D to the speaker 36, to control the speaker 36 so that its sound volume may be increased by, for example, three steps as compared to that of FIG. 13A. Thus, by making the sliding speed Vx in sliding on the input detection plane larger than the standard sliding speed Vo, it is possible to control a sound volume adjustment quantity.

Next, an example of information processing in the digital camera 100 according to the first embodiment will be described with reference to FIGS. 14A-14D and 15.

In the present embodiment, it is assumption that information is input by performing a touch operation to slide on the input detection plane. In this embodiment, such a case is assumed that a touched position and a sliding speed of a finger 30a of the operator who performs the touch operation on the input detection plane are detected, to compute a vibration pattern based on these detected touched position and sliding speed of the finger 30a of the operator's finger 30a, thereby to vibrate the input detection plane based on the computed vibration pattern.

Further, in computation of the vibration pattern, as the finger 30a of the operator goes away from a point where it has touched the input detection plane originally, such a vibration pattern of the input detection plane is computed as to generate vibrations from its low frequency and small amplitude to its high frequency and large amplitude. As operation modes of this digital camera 100, a slide input mode and the other processing mode are prepared, so that based on switchover of these modes, various kinds of information processing are performed. The other mode contains a shutter button operation, an erasure button operation, a power source button operation, a switchover operation between the standard mode and the snap mode, etc.

Figure 14A:
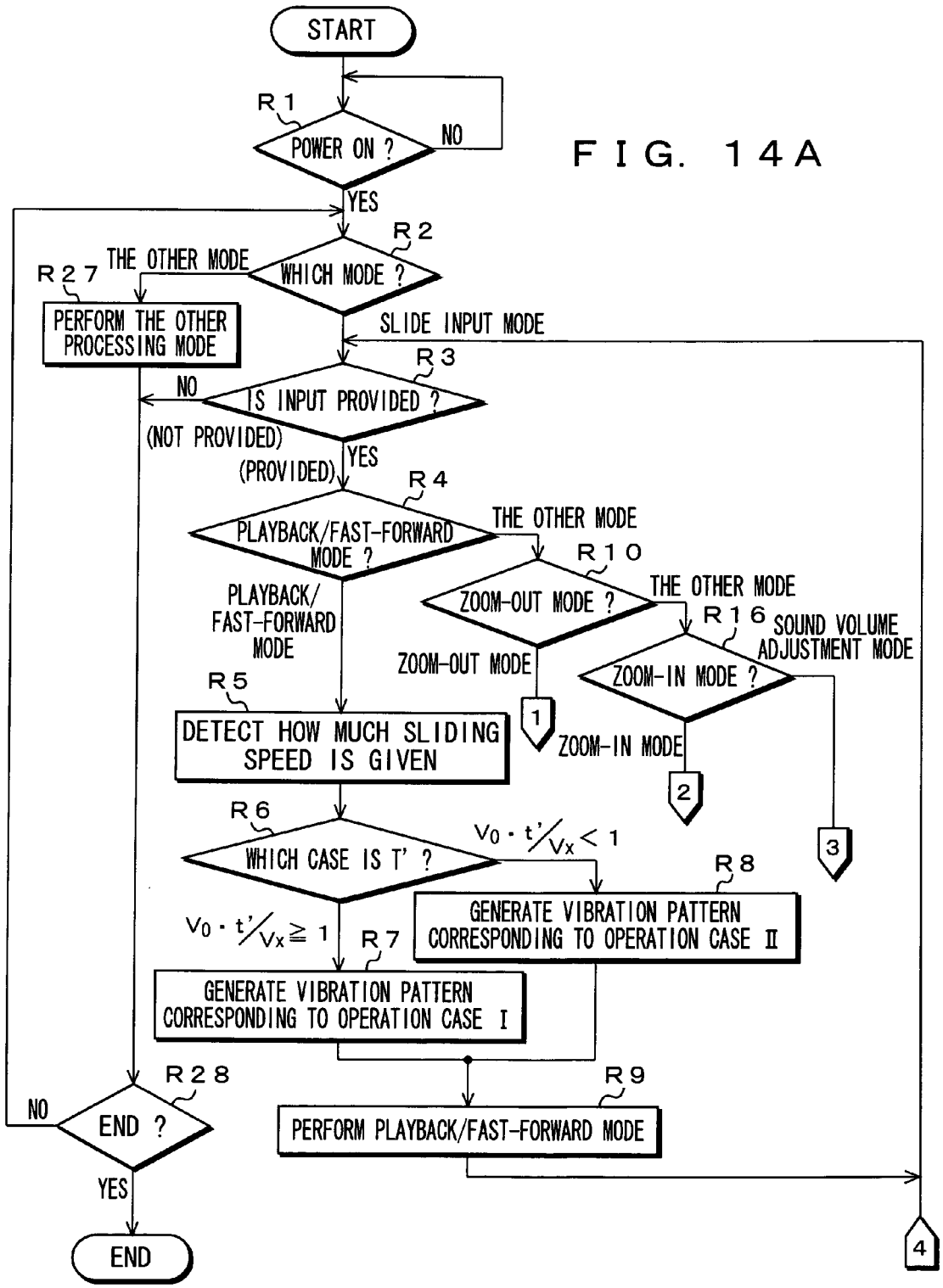
FIG. 14A is a flowchart showing an information processing example (No. 1) in a digital camera 100 according to a first embodiment.
Figures 14B, 14C:
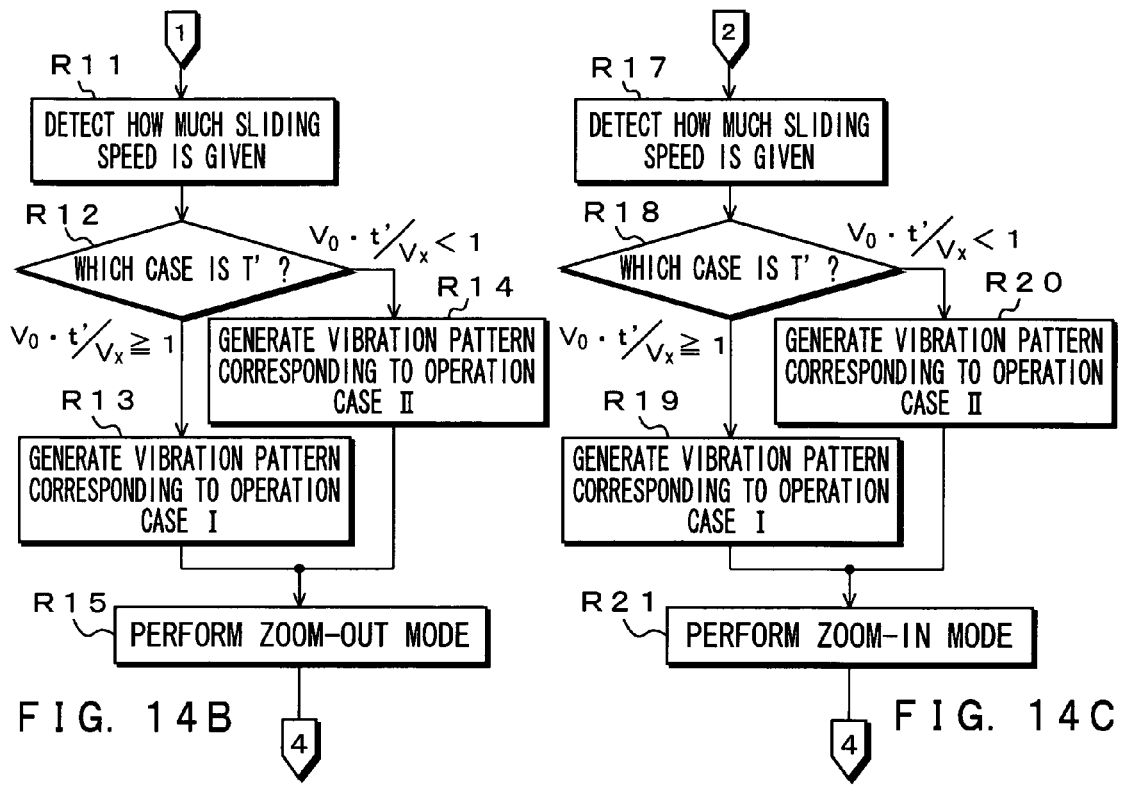
FIG. 14B is a flowchart showing an information processing example (No. 2) in the digital camera 100.
FIG. 14C is a flowchart showing an information processing example (No. 3) in the digital camera 100.

In these information processing conditions, a power-on operation is awaited at step R1 of a flowchart of FIG. 14A. For example, the CPU 32 detects power-on information and then activates the system. The power-on information generally occurs when a timer function starts, to turn on a power switch on a portable telephone which has been sleeping.

The process goes to step R2 where the CPU 32 branches its controls in accordance with whether the system is in the slide input mode or the other processing mode. The slide input mode is referred to as an operation to provide an input by performing a touching input to slide on the input detection plane when making switchover among the playback/fast-forward mode, the zoom-out mode, the zoom-in mode, the sound volume adjustment mode, etc.

If the slide input mode is set, the process goes to step R3 where it is detected whether an input is provided. Whether an input is provided or not is decided by detecting whether the input detection section 24 is touched. If the input detection section 24 is touched, the process goes to step R4 where the control branches in accordance with whether the input mode is selected (set) to the playback/fast-forward mode or the other mode. It is to be noted that which one of the input modes is selected will be described in the case of, for example, processing the playback/fast-forward mode, the zoom-out mode, the zoom-in mode, and the sound volume adjustment mode in this order.

In this embodiment, when the operator 30 touches a playback mode region, not shown, of the input detection section 24, touch position information S1 and force information S2 are supplied to the A/D driver 31, so that a playback mode image can be displayed on the display portion 29 of the digital camera 100. Then, the A/D driver 31 converts a position detection signal into a digital signal and detects position information D1 and force information D2 and whether the system is in the cursoring state or the selection state, thus generating cursoring/selection data D3 as a flag.

If the playback/fast-forward mode is selected, the process goes to step R5 where it is determined how much a sliding speed Vx is given. In this case, the CPU 32 calculates a rate of change Vx, for example, with respect to the time axis in the input positions P1-P5 shown in FIGS. 6A and 6B, which is detected by the input detection section 24, that is, the sliding speed Vx of the operator's finger 30a.

Then, the process goes to step R6 where the CPU 32 detects operation case I or operation case II based on a discriminant of T'=Vo·t'/Vx, to provide a control branch. In this embodiment, the sliding speed Vx in the case of going over the input detection plane PR at the standard sliding speed Vo or lower (V1≦Vo) is set to be equal to V1 (Vx=V1). This case is defined to be operation case I. Table 2 shown earlier shows contents of a haptic waveform Wv with respect to the sliding speed V1.

Therefore, if a relationship of Vo·t'/Vx≧1 is found as a result of the above decision, the process goes to step R7 where the actuator drive circuit 37 is supplied with such control information as to generate a vibration pattern corresponding to operation case I. In this case, according to such an example as shown in FIGS. 7B-7G, at the input detection time point TP2, based on the command D, the actuator drive circuit 37 outputs such the vibration control signals Sa-Sf as to generate the vibration pattern shown in Table 2. The actuator 25a is supplied with the vibration control signal Sa; the actuator 25b is supplied with the vibration control signal Sb; the actuator 25c is supplied with the vibration control signal Sc; the actuator 25d is supplied with the vibration control signal Sd; the actuator 25e is supplied with the vibration control signal Se; and the actuator 25f is supplied with the vibration control signal Sf, respectively.

The actuators 25a-25f vibrate for about 0.8 s based on the vibration control signals Sa-Sd. Specifically, in the vibration waveform shown in FIG. 7B, they vibrate in accordance with a vibration pattern having frequency fx=50 Hz, amplitude Ax=5 μm, and the number of times Nx=10 for about 0.2 s at the first stage i thereof. Hereinafter, this pattern is described as [fx Ax Nx]=[50 5 10]. Similarly, they vibrate in accordance with vibration pattern [fx Ax Nx]=[100 10 20] for about 0.2 s at the second stage ii thereof too. At the third stage iii thereof too, they vibrate in accordance with vibration pattern [fx Ax Nx]=[200 20 40] for about 0.2 s. At the fourth stage iv thereof too, they vibrate in accordance with vibration pattern [fx Ax Nx]=[400 30 80] for about 0.2 s.

Further, according to a haptic image received by the operator's finger 30a in operation case I in FIG. 7G as a result of such propagation of vibration patterns shown in FIGS. 7C, 7D, 7E, and 7F, it is possible to obtain a haptic sense based on the vibration patterns shown in FIGS. 7B-7F in a period of time when moving the input positions P2-P4. At the input position P2, it is possible to obtain a haptic sense based on the vibration pattern [fx Ax Nx]=[50 5 10] for about 0.2 s of the first stage i, a haptic sense based on the vibration pattern [fx Ax Nx]=[100 10 20] for about 0.2 s of the second stage ii, a haptic sense based on the vibration pattern [fx Ax Nx]=[200 20 40] for about 0.2 s of the following third stage iii, and a haptic sense based on the vibration pattern [fx Ax Nx]=[400 30 80] for about 0.2 s of the fourth stage iv. Then, the process goes to step R9 where the fast-forward mode is performed based on the sliding speed Vx.

In this embodiment, the sliding speed Vx at which the input detection plane PR is gone over faster than the standard sliding speed Vo (V2>Vo) is set equal to V2 (Vx=V2). This is defined to be operation case II. Table 3 shown earlier shows contents of the haptic waveform Wv with respect to the sliding speed V2. Therefore, if a relationship of Vo·t'/Vx<1 is decided at the above-described step R6, the process goes to step R8 where the actuator drive circuit 37 is supplied with such control information as to generate a vibration pattern corresponding to the operation case II.

In this case, according to such an example as shown in FIGS. 8A-8G, at the input detection time TP2, based on the command D, the actuator drive circuit 37 outputs such vibration control signals Sa-Sf as to generate the vibration pattern shown in Table 3. The actuator 25a is supplied with the vibration control signal Sa; the actuator 25b is supplied with the vibration control signal Sb; the actuator 25c is supplied with the vibration control signal Sc; the actuator 25d is supplied with the vibration control signal Sd; the actuator 25e is supplied with the vibration control signal Se; and the actuator 25f is supplied with the vibration control signal Sf, respectively.

The actuators 25a-25f vibrate for about 0.4 s based on the vibration control signals Sa-Sf. Specifically, in the vibration waveform shown in FIG. 8B, they vibrate in accordance with a vibration pattern having a frequency fx=50 Hz, amplitude Ax=5 μm, and the number of times Nx=5 for about 0.1 s at the first stage i thereof. Hereinafter, this pattern is described as [fx Ax Nx]=[50 5 5]. Similarly, they vibrate in accordance with vibration pattern [fx Ax Nx]=[100 10 10] for about 0.1 s at the second stage ii thereof too. At the third stage iii thereof too, they vibrate in accordance with vibration pattern [fx Ax Nx]=[200 20 20] for about 0.1 s. At the fourth stage iv thereof too, they vibrate in accordance with vibration pattern [fx Ax Nx]=[400 30 40] for about 0.1 s.

Further, according to a haptic image received by the operator's finger 30a in the operation case II in FIG. 8G as a result of such propagation of vibration patterns shown in FIGS. 8C, 8D, 8E, and 8F, it is possible to obtain a haptic sense based on vibration patterns shown in FIGS. 8B-8F in a period of time when moving to the input positions P2-P4. At the input position P2, it is possible to obtain a haptic sense based on the vibration pattern [fx Ax Nx]=[50 5 5] for about 0.1 s of the first stage i, a haptic sense based on the vibration pattern [fx Ax Nx]=[100 10 10] for about 0.1 s of the second stage ii, a haptic sense based on the vibration pattern [fx Ax Nx]=[200 20 20] for about 0.1 s of the third stage iii, and a haptic sense based on the vibration pattern [fx Ax Nx]=[400 30 40] for about 0.1 s of the fourth stage iv.

Accordingly, if the finger 30a moves on the input detection plane PR faster than the standard sliding speed Vo, i, the third and fourth stages iii and iv provide the dead portion 80n the conventional method, but in the embodiment of the present invention, such a dead portion 80 disappears, so that such a haptic image as shown in FIG. 8G can be obtained. Subsequently, the process goes to step R9 where the fast-forward mode is performed based on the sliding speed Vx. Then, the process returns to the step R3. Then, the process returns to the step R3.

Further, when the input detection section 24 is further touched at the step R3 and if the input mode is the other mode that is any other than the playback/fast-forward mode at step R4, the process goes to step R10 where a control branch is provided in accordance with whether the zoom-out mode or the other mode is set. If the zoom-out mode is selected, the process goes to step R11 in a flowchart shown in FIG. 14B where it is detected how much the sliding speed Vx (see the step R6) is given.

Then, the process goes to step R12 where the CPU 32 detects operation case I or II based on a discriminant of T'=Vo·t'/Vx to provide a control branch. In this embodiment, if a relationship of Vo·t'/Vx≧1 is established, the process goes to step R13 where the actuator drive circuit 37 is supplied with such control information as to generate a vibration pattern corresponding to the operation case I (see the step R7).

Then, the process goes to step R15 where the zoom-out mode is performed. On the other hand, if a relationship of Vo·t'Vx<1 is decided at the above-described step R12, the process goes to step R14 where the actuator drive circuit 37 is supplied with such control information as to generate a vibration pattern corresponding to operation case II (see the step R8). Subsequently, the process goes to the step R15 where the zoom-out mode is performed based on the sliding speed Vx. Then, the process returns to the step R3 of the flowchart shown in 14D FIG. 14A.

Further, when the input detection section 24 is touched again at the step R3 and if the input mode is the other mode that is any other than the playback/fast-forward mode and the zoom-out mode at the steps R4 and R10, the process goes to step R16 where a control branch is provided in accordance with whether the zoom-in mode or the other mode is set. If the zoom-in mode is set, the process goes to step R17 of a flowchart shown in FIG. 14C, to detect how much the sliding speed Vx (see the step R6) is given.

Then, the process goes to step R18 where the CPU 32 detects operation case I or II based on a discriminant of T'=Vo·t'/Vx to provide a control branch. In this embodiment, if a relationship of Vo·t'/Vx≧1 is established, the process goes to step where the actuator drive circuit 37 is supplied with such control information as to generate a vibration pattern corresponding to the operation case I (see the step R7).

Then, the process goes to step R21 where the zoom-in mode is performed based on the sliding speed Vx. Simultaneously, the CPU 32 outputs the command D to the display portion 29 to carry out a display control. For example, the CPU 32 calls a subroutine of FIG. 15 to detects a difference between a coordinate value X1 of an input start point and a coordinate value X2 of a current point, that is, an input position difference of X2–X1 at step ST1 in its flowchart. Then, the process goes to step ST2 where this input position difference X2–X1 is compared with a preset control threshold value x. If X2–X1>x is decided at step ST3, the process goes to step ST4 where the CPU 32 outputs the command D to the display portion 29. Based on the command D, the display portion 29 switches display of a pre-zoom-in image shown in FIG. 12A to that of a post-zoom-in image shown in FIG. 12B at step ST5.

On the other hand, if a relationship of Vo·t'/Vx<1 is decided at the above-described step R18, the process goes to step R20 where the actuator drive circuit 37 is supplied with such control information as to generate a vibration pattern corresponding to operation case II (see the step R8). Then, the process goes to the step R21 where the zoom-in mode is performed based on the sliding speed Vx. Simultaneously, based on the command D, the display portion 29 switches display of the pre-zoom-in image shown in FIG. 12A to that of the post-zoom-in image shown in FIG. 12C. Then the process returns to the step R3 of the flowchart shown in FIG. 14A.

Figure 14D:
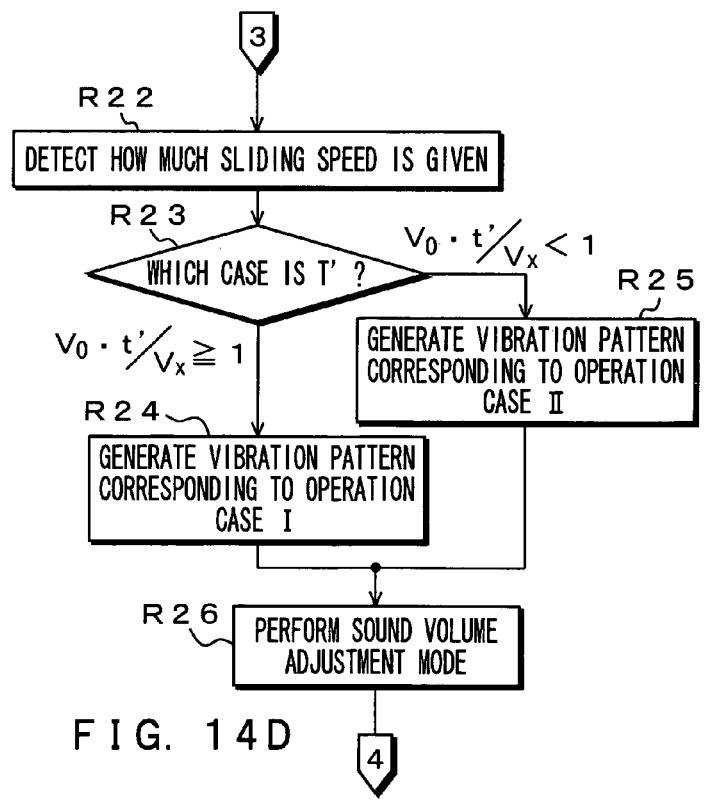
FIG. 14D is a flowchart showing an information processing example (No. 4) in the digital camera 100.

Further, when the input detection section 24 is further touched at the step R3 and if the input mode is the other mode that is any other than the playback/fast-forward mode, the zoom-in mode, and the zoom-out mode at the steps R4, R10, and R16, to set (select) the sound volume adjustment mode and the process goes to step R22 of a flowchart shown in FIG. 14D where it is detected how much the sliding speed Vx (see the step R6) is given.

Then, the process goes to step R23 where the CPU 32 detects operation case I or II based on the discriminant of T'=Vo·t'/Vx to provide a control branch. In this embodiment, if Vo·t'/Vx≧1 is decided, the process goes to step R24 where the actuator drive circuit 37 is supplied with such control information as to generate a vibration pattern corresponding to the operation case I (see the step R7).

Then, the process goes to step R26 where the sound volume adjustment mode is performed based on the sliding speed Vx. Simultaneously, the CPU 32 outputs the command D to the display portion 29 to carry out a display control. For example, the CPU 32 calls the subroutine of FIG. 15 to detect a difference between a coordinate value X1 of an input start point and a coordinate value X2 of a current point, that is, an input position difference of X2–X1 at the step ST1 in its flowchart. Then, the process goes to the step ST2 where this input position difference X2–X1 is compared with a preset control threshold value x. If X2–X1>x is decided at the step ST3, the process goes to the step ST4 where the CPU 32 outputs the command D to the display portion 29. Based on the command D, the display portion 29 switches display of a pre-sound-volume-adjustment image shown in FIG. 13A to that of a post-sound-volume-adjustment image shown in FIG. 13B at the step ST5.

On the other hand, if a relationship of Vo·t'/Vx<1 is decided at the above-described step R23, the process goes to step R25 where the actuator drive circuit 37 is supplied with such control information as to generate a vibration pattern corresponding to the operation case II (see the step R8). Then, the process goes to step R26 where the sound volume adjustment mode is performed based on the sliding speed Vx. Simultaneously, based on the command D, the display portion 29 switches display of the pre-sound-volume-adjustment image shown in FIG. 13A to that of the post-sound-volume-adjustment image shown in FIG. 13C. Then, the process returns to the step R3 of the flowchart shown in FIGS. 14A-14D.

It is to be noted that if the other processing mode is selected at the step R2, the process goes to step R27 where the other processing mode is performed. In the other processing mode, a shutter button operation, an erasure button operation, a power source button operation, an operation to switch between the standard mode and the snap mode, etc. are performed. Then, the process goes to step R28. Further, if the input detection section 24 is not touched at the step R3, the process goes to step R28 where the CPU 32 decides whether to end the information processing. For example, if having detected any power-off information, the process ends the information processing. If no power-off information is detected, the process returns to the step R2.

In such a manner, according to the embodiments of the digital camera and the information input method related to the present invention, on the assumption that the touch operation is performed to slide on the input detection plane of the input detection section 24, the input detection section 24 detects a touched position and a sliding speed of the operator's finger 30*a*. The CPU 32 computes the vibration pattern based on the sliding speed of the operator's finger 30*a* detected by the input detection section 24. Based on the vibration pattern computed by the CPU 32, the actuators 25*a*-25*f* etc. vibrate the input detection plane.

Therefore, it is possible to generate plural kinds of vibrations which have different vibration patterns for each operator and which correspond to a sliding speed or a lapse of sliding time of the operator's finger 30*a*. It is thus possible to improve convenience and certainty of the haptic input function. Besides, a haptic-provided input function can be introduced into more kinds of input forms.

Second Embodiment

The following will describe an example of a haptic function-provided input mechanism of a digital camera 200 as the second embodiment. In the second embodiment, input information is controlled variably based on distance information Lx on a distance from a point where the finger 30*a* of an operator touches an input detection plane PR to a point where its sliding stops.

In contrast to the first embodiment, according to the haptic function-provided input mechanism of the digital camera 200 shown in FIG. 16, below an input detection section 24, actuators A and B are provided. The input detection section 24 is arranged to bridge between the actuators A and B in such a configuration that these actuators A and B serve as bridge girders. As the actuators A and B, the actuators 25*e* and 25*f* described with the first embodiment are used.

The input detection section 24, the actuators A and B, etc. are all fixed with an adhesive agent or the like via space members 28*a*-28*f*. As the input detection section 24, an electrostatic capacitive sheet (touch panel) and the like are used to detect a position where the operator's finger 30*a* has touched. An arrow in the figure indicates a touch-and-moving direction of the operator's finger 30*a*. It is to be noted that for a configuration of a control system, the first embodiment can be referred thereto, so that its explanation will be omitted. This haptic function-provided input mechanism is arranged approximately at an upper part of a body of the camera.

In FIG. 16, on the input detection section 24, six input positions P1-P6 are set. In terms of operation contents, the input position P1 indicates a "start point" of an input operation. The input point P2 indicates a point representing, for example, a zoom quantity "X0.5" as an input operation quantity. With respect to input position P1 as an origin point 0, the input position P2 is set to a position that is distant therefrom by separation distance L1. The input point P3 indicates a point representing a zoom quantity "X1". Similarly, the input point P3 is set to a position distant by separation distance L2.

The input point P4 indicates a point representing a zoom quantity "X2" as an input operation quantity. The input point P4 is set to a position distant by separation distance L3. The input point P5 indicates a point representing a zoom quantity "X4" as an input operation quantity. The input point P5 is set to a position distant by separation distance L4. The input point P6 indicates a point representing an "end position" of the input operation. The input point P6 is set to a position distant by separation distance L5.

The operator goes over the input detection plane PR at an arbitrary sliding speed along the touch-and-moving direction indicated by the arrow in the figure. In this case, a CPU 32 described with the first embodiment detects which one of the input positions P2-P6 the operator's finger 30*a* has reached from the input position P1 detected by the input detection section 24.

Further, according to this haptic function-provided input mechanism, if the operator's finger 30*a* touches the input detection plane at the input position P1 thereof, the actuator A vibrates this input detection plane PR based on a vibration pattern having frequency of fx=400 Hz, amplitude of Ax=30μm, and the number of times of Nx=20. Further, if the operator's finger 30*a* is slid from its input position P1 toward the arrow direction, the actuator A once stops vibrating thereof and, when the next input position P2 is reached, vibrates the input detection plane PR based on a vibration pattern having fx=200 Hz, Ax=10μm, and Nx=1.

Further, if the operator's finger 30*a* is slid from its input position P2 toward the arrow direction, the actuator A once stops vibrating thereof and, when the next input position P3 is reached, vibrates the input detection plane PR based on a vibration pattern having fx=200 Hz, Ax=15μm, and Nx=1. Further, if the operator's finger 30*a* is slid from its input position P3 toward the arrow direction, the actuator A once stops vibrating thereof and, when the next input position P4 is reached, vibrates the input detection plane PR based on a vibration pattern having fx=200 Hz, Ax=20μm, and Nx=1.

Further, if the operator's finger 30*a* is slid from its input position P4 toward the arrow direction, the actuator A once stops vibrating thereof and, when the next input position P5 is reached, vibrates the input detection plane PR based on a vibration pattern having fx=200Hz, Ax=25μm, and Nx=1. Further, if the operator's finger 30*a* is slid from its input position P5 toward the arrow direction, the actuator A once stops vibrating thereof and, when the next input position P6 is reached, vibrates the input detection plane PR based on a vibration pattern having fx=400 Hz, Ax=30μm, and Nx=20.

It is to be noted that while the operator's finger 30*a* is in contact with the input detection plane PR, the actuator B is set to continue to vibrate the input detection plane PR based on a vibration pattern having fx=200 Hz and Ax=30μm. Table 4 shows relationships between input positions P1-P6 and any one of the vibration patterns of the actuators A and B, their vibration sounds, and the operation contents thereof.

TABLE 4

| Input position | P1 | | P2 | | P3 | | P4 | | P5 | | P6 |
|---|---|---|---|---|---|---|---|---|---|---|---|
| Vibration of actuator A | 400 Hz 30 μm 20 times | None | 200 Hz 10 μm 1 time | None | 200 Hz 15 μm 1 time | None | 200 Hz 20 μm 1 time | None | 200 Hz 25 μm 1 time | None | 400 Hz 30 μm 20 times |
| Vibration of actuator B | fx = 200 Hz, Ax = 30 μm, Nx = Continuous ⟶ | | | | | | | | | | |
| Vibration sound | Peep | | Peep | | Peep | | Peep | | Peep | | Peep |
| Operation contents | Start position (dead end) | | X0.5 | | X1 | | X2 | | X4 | | End position (dead end) |

Next, an example of input operations in the haptic function-provided digital camera 200 will be described.

For example, if the operator's finger 30a shown in FIG. 16 has touched the input position P1, the input detection section 24 detects that the operator's finger 30a has touched the input position P1 and notifies the CPU 32 of it. When having received this notification, the CPU 32 controls outputs of the actuators A and B. The actuator A vibrates the input detection plane PR based on a vibration pattern having fx=400 Hz, Ax=30μm, and Nx=20. As a result of this vibration, a "peep" vibration sound occurs. The actuator B continuously vibrates the input detection plane PR based on a vibration pattern having fx=200 Hz and Ax=30μm. The CPU 32 identifies a "start position" of the input operation.

Further, if the operator's finger 30a moves from, for example, the input position P1 by the separation distance L1 as the distance information Lx, it reaches the input position P2. In this case, the input detection section 24 detects that the operator's finger 30a has arrived at the input position P2 and notifies the CPU 32 of it. When having received this notification, the CPU 32 controls an output of the actuator A. According to this control, the actuator A, which has once stopped vibrating thereof, vibrates the input detection plane PR based on the vibration pattern having fx=200 Hz, Ax=10μm, and Nx=1 when the operator's finger 30a has arrived at the input position P2. As a result of this vibration, a "peep" vibration sound occurs. The CPU 32 sets a zoom quantity "X0.5" to a zoom drive system etc. as an input operation quantity.

Further, if the operator's finger 30a moves from the input position P1 by the separation distance L2, it reaches the input position P3. In this case, the input detection section 24 detects that the operator's finger 30a has arrived at the input position P3 and notifies the CPU 32 of it. When having received this notification, the CPU 32 controls an output of the actuator A. According to this control, the actuator A, which has once stopped vibrating thereof, vibrates the input detection plane PR based on a vibration pattern having fx=200 Hz, Ax=15μm, and Nx=1 when the operator's finger 30a has arrived at the input position P3. As a result of this vibration, a "peep" vibration sound occurs. The CPU 32 sets a zoom quantity "X1" to the zoom drive system etc. as an input operation quantity.

Further, if the operator's finger 30a moves from the input position P1 by the separation distance L3, it reaches the input position P4. In this case, the input detection section 24 detects that the operator's finger 30a has arrived at the input position P4 and notifies the CPU 32 of it. When having received this notification, the CPU 32 controls an output of the actuator A. According to this control, the actuator A, which has once stopped vibrating, vibrates the input detection plane PR based on a vibration pattern having fx=200Hz, Ax=20μm, and Nx=1 when the operator's finger 30a has arrived at the input position P4. As a result of this vibration, a "peep" vibration sound occurs. The CPU 32 sets a zoom quantity "X2" to the zoom drive system etc. as an input operation quantity.

Further, if the operator's finger 30a moves from the input position P1 by the separation distance L4, it reaches the input position P5. In this case, the input detection section 24 detects that the operator's finger 30a has arrived at the input position P5 and notifies the CPU 32 of it. When having received this notification, the CPU 32 controls an output of the actuator A. According to this control, the actuator A, which has once stopped vibrating thereof, vibrates the input detection plane PR based on the vibration pattern having fx=200 Hz, Ax=25μm, and Nx=1 when the operator's finger 30a has arrived at the input position P5. As a result of this vibration, a "peep" vibration sound occurs. The CPU 32 sets a zoom quantity "X4" to the zoom drive system etc. as an input operation quantity.

It is to be noted that if the operator's finger 30a moves from the input position P1 by the separation distance L5, it reaches the input position P6. In this case, the input detection section 24 detects that the operator's finger 30a has arrived at the input position P6 and notifies the CPU 32 of it. When having received this notification, the CPU 32 controls an output of the actuator A. According to this control, the actuator A, which has once stopped vibrating thereof, vibrates the input operation face detection plane PR based on the vibration pattern having fx=400 Hz, Ax=30m, and Nx=20 when the operator's finger 30a has arrived at input position P6. As a result of this vibration, a "peep" vibration sound occurs. The CPU 32 identifies an "end position" of the input operation.

In such a manner, according to the digital camera 200 with the haptic function-provided input mechanism related to the second embodiment, input information is controlled variably based on the distance information Lx on a distance from a point where the finger 30a of an operator has touched an input detection plane PR to a point where its sliding stops.

Therefore, it is possible to obtain a haptic sense that matches an input operation to adjust an analog quantity and that corresponds to a sliding position of the operator's finger 30a. It is thus possible to generate a sense of operation that matches an operation image, thereby improving convenience and certainty of the haptic input function.

Although the above embodiments have described a case of the digital camera in relation to an electronic device, this haptic function-provided input device is applicable to an information processing apparatus such as a notebook-sized personal computer and an information portable terminal unit such as a portable telephone, an electronic notebook, a game device, or an electronic book.

Industrial Applicability

The present invention could be extremely well applied to a digital camera, an information processing apparatus, a portable telephone, an information portable terminal unit, etc. in which information is input by performing the touch operation to slide on an input detection plane.

The invention claimed is:

1. A haptic function-provided input device that performs a touch operation to slide on an input detection plane, said device comprising:
    an input detection unit, which has the input detection plane, that detects a touching position of an operation body and a sliding speed of the operation body;
    a computation unit configured to compute a vibration pattern based on the sliding speed detected by the input detection unit; and
    a vibration unit that vibrates the input detection plane based on the vibration pattern computed by the computation unit, wherein the computation unit is configured to determine an operation case to compute the vibration pattern, based on a ratio of the sliding speed of the operation body to a shift in an excitation timing between two actuators of the vibration unit.

2. The haptic function-provided input device according to claim 1, wherein the computation unit computes a vibration pattern of the input detection plane to generate vibrations from a low frequency and a small amplitude to a high frequency and a large amplitude, as the operation body goes away from a position where the operation body has touched the input detection plane.

3. The haptic function-provided input device according to claim 1, further comprising:
    a control unit configured to control input information variably based on the sliding speed.

4. The haptic function-provided input device according to claim 1, further comprising:
    a control unit configured to control input information variably based on distance information on a distance from a point where the operation body touches the input detection plane to a point where a sliding of the operation body then stops.

5. The haptic function-provided input device according to claim 1, wherein, when the sliding speed of the operation body is less than a predetermined sliding speed, the vibration pattern includes a first number of waves, and, when the sliding speed of the operation body is greater than the predetermined sliding speed, the vibration pattern includes a second number of waves less than the first number of waves.

6. An information input method for inputting information by performing a touch operation to slide on an input detection plane, said method comprising:
    detecting a touched position and a sliding speed of an operation body that touches the input detection plane;
    computing a vibration pattern based on the touched position and the sliding speed that are detected; and
    vibrating the input detection plane with two actuators, based on the computed vibration pattern, wherein the computing includes determining an operation case, based on a ratio of the sliding speed of the operation body to a shift in an excitation timing between the two actuators, to compute the vibration pattern.

7. The information input method according to claim 6, wherein, when computing the vibration pattern, a vibration pattern of the input detection plane to generate vibrations from a low frequency and a small amplitude to a high frequency and a large amplitude is computed, as the operation body goes away from a position where the operation body has touched the input detection plane.

8. The information input method according to claim 6, wherein an amount of the input information is adjusted on the basis of the sliding speed.

9. The information input method according to claim 6, wherein the input information is selected on the basis of distance information on a distance from a point where the operation body touches the input detection plane to a point where a sliding of the operation body then stops.

10. An electronic device, comprising:
    a haptic function-provided input device that performs a touch operation to slide on an input detection plane; and
    display means for displaying a display image based on information input by the input device, wherein
    said input device includes
        an input detection unit, which has the input detection plane, that detects a touching position of an operation body and a sliding speed of the operation body;
        computation means for computing a vibration pattern based on the sliding speed detected by the input detection unit; and
        a vibration unit that vibrates the input detection plane based on the vibration pattern computed by the computation means, wherein the computation means determines an operation case to compute the vibration pattern based on a ratio of the sliding speed of the operation body to a shift in an excitation timing between two actuators of the vibration unit.

11. The electronic device according to claim 10, wherein the computation means computes a vibration pattern of the input detection plane to generate vibrations from a low frequency and a small amplitude to a high frequency and a large amplitude, as the operation body goes away from a position where the operation body has touched the input detection plane.

12. The electronic device according to claim 10, further comprising:
    control means for controlling the input information variably based on the sliding speed.

13. The electronic device according to claim 10, further comprising:
    control means for controlling the input information variably based on distance information on a distance from a point where the operation body touches the input detection plane to a point where a sliding of the operation body then stops.

14. A haptic function-provided input device that performs a touch operation to slide on an input detection plane, said device comprising:
    an input detection unit, which has the input detection plane, that detects a touching position of an operation body and a sliding speed of the operation body;
    a computation unit configured to compute a vibration pattern based on the sliding speed detected by the input detection unit; and
    a vibration unit that vibrates the input detection plane based on the vibration pattern computed by the computation unit, wherein the computation unit is configured to compute the vibration pattern further based on a shift in an excitation timing between two actuators of the vibration unit, and the computation unit is configured to compute the vibration pattern based on $V_o * t'/V_x$, where $V_o$ is a standard sliding speed, $t'$ is the shift in the excitation timing between the two actuators at $V_o$, and $V_x$ is the sliding speed of the operation body.

\* \* \* \* \*